(12) United States Patent
Goto et al.

(10) Patent No.: US 10,318,213 B2
(45) Date of Patent: Jun. 11, 2019

(54) INFORMATION PROCESSING APPARATUS, INFORMATION PROCESSING METHOD, AND STORAGE MEDIUM STORING PROGRAM

(71) Applicant: CANON KABUSHIKI KAISHA, Tokyo (JP)

(72) Inventors: Fumitaka Goto, Tokyo (JP); Kiyoshi Umeda, Kawasaki (JP); Naoki Sumi, Kawasaki (JP); Tomohiro Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/002,466

(22) Filed: Jun. 7, 2018

(65) Prior Publication Data

US 2018/0285026 A1 Oct. 4, 2018

Related U.S. Application Data

(63) Continuation of application No. 15/586,660, filed on May 4, 2017, now Pat. No. 10,019,206, which is a continuation of application No. 14/740,678, filed on Jun. 16, 2015, now Pat. No. 9,678,700.

(30) Foreign Application Priority Data

Jun. 30, 2014 (JP) ................. 2014-135174

(51) Int. Cl.
G06F 3/12 (2006.01)
G06F 9/455 (2018.01)
G06F 9/46 (2006.01)
G06F 9/54 (2006.01)

(52) U.S. Cl.
CPC ............ *G06F 3/121* (2013.01); *G06F 3/1206* (2013.01); *G06F 3/1236* (2013.01); *G06F 3/1244* (2013.01); *G06F 3/1253* (2013.01); *G06F 3/1285* (2013.01); *G06F 3/1292* (2013.01); *G06F 9/45508* (2013.01);
(Continued)

(58) Field of Classification Search
CPC .......................... G06F 3/1236; G06F 3/1253; G06F 3/1285; G06F 3/1297
USPC .............. 358/1.13, 1.15, 1.16; 717/121, 136
See application file for complete search history.

(56) References Cited

U.S. PATENT DOCUMENTS 8,873,090 B2 10/2014 Nakagawa
9,195,424 B2 11/2015 Nakagawa
9,436,413 B2 9/2016 Mizoguchi et al.
(Continued)

FOREIGN PATENT DOCUMENTS

JP 2004127252 A 4/2004
JP 2010208266 A 9/2010
JP 2011-233034 A 11/2011

*Primary Examiner* — Jamares Q Washington
(74) *Attorney, Agent, or Firm* — Venable LLP

(57) ABSTRACT

When communicating with a printing apparatus used for the print function of an application, communication with the printing apparatus is requested of a second layer constituted by an instruction set which is translated in advance to be able to execute the instruction set by a processor, in a first layer constituted by a script instruction set which is translated to be able to execute the script instruction set by the processor when executing the application and is executed. In the second layer, communication with the printing apparatus is performed in accordance with the request.

25 Claims, 15 Drawing Sheets

(52) U.S. Cl.
CPC .......... *G06F 9/45529* (2013.01); *G06F 9/465* (2013.01); *G06F 9/54* (2013.01)

(56) References Cited

U.S. PATENT DOCUMENTS

| | | |
|---|---|---|
| 9,465,571 B2 | 10/2016 | Kato et al. |
| 9,471,284 B2 | 10/2016 | Kurokawa et al. |
| 9,582,232 B2 | 2/2017 | Umeda et al. |
| 9,678,700 B2 | 6/2017 | Goto et al. |
| 10,019,206 B2 * | 7/2018 | Goto ................ G06F 3/121 |
| 2003/0025932 A1 | 2/2003 | Chiba et al. |
| 2006/0017958 A1 | 1/2006 | Jackson et al. |
| 2009/0180133 A1 * | 7/2009 | Yamamoto ............ G06F 3/1203 358/1.13 |
| 2012/0026548 A1 | 2/2012 | Nakagawa |
| 2012/0324376 A1 | 12/2012 | Hong |
| 2015/0009537 A1 | 1/2015 | Nakagawa |
| 2015/0363144 A1 | 12/2015 | Suzuki et al. |
| 2015/0365546 A1 | 12/2015 | Umeda et al. |
| 2015/0378643 A1 | 12/2015 | Sumi et al. |
| 2015/0378645 A1 | 12/2015 | Kunieda et al. |
| 2015/0379741 A1 | 12/2015 | Obayashi et al. |

* cited by examiner

INFORMATION PROCESSING APPARATUS, INFORMATION PROCESSING METHOD, AND STORAGE MEDIUM STORING PROGRAM

CROSS-REFERENCE TO RELATED APPLICATIONS

This application is a Continuation of U.S. patent application Ser. No. 15/586,660, filed May 4, 2017, which is a Continuation of U.S. patent application Ser. No. 14/740,678, filed Jun. 16, 2015, now U.S. Pat. No. 9,678,700, which claims priority to Japanese Patent Application No. 2014-135174, filed Jun. 30, 2014, the entire disclosures of which are all hereby incorporated by reference herein.

BACKGROUND OF THE INVENTION

Field of the Invention

The present invention relates to an information processing apparatus and information processing method for performing image processing, and a storage medium storing a program.

Description of the Related Art

In recent years, multi-function mobile phones (to be referred to as mobile computers hereinafter) incorporating a camera function have become widespread, and far surpass digital cameras and conventional personal computers (to be referred to as PCs hereinafter) in sales. The system of such a mobile computer is basically formed from three elements, that is, hardware as the computer itself, an operating system (to be referred to as an OS hereinafter) operating on the hardware, and an application operating on the OS. The user can activate a map, mail, or browser by using the application, and perform an operation such as browsing of a Web site on the Internet. As examples of the form of such an application operating on the mobile computer, there are mainly two application forms, that is, a native application and a Web application. The features of each application will be explained below.

The native application is normally developed in a development environment and development language which are prepared for each OS. For example, the C/C++ language is used on an OS provided by company A, the Java® language is used on an OS provided by company B, and a different development language is used on an OS provided by company C. In this way, the native application is developed in a different development language for each OS. The native application is compiled in advance in each development environment, and converted from a so-called high-level language understandable by a human into instruction sets interpretable by the CPU of the computer. Thus, the native application has an advantage that a high-speed operation is possible because the CPU directly interprets instructions.

The Web application is an application operating on a Web browser which is normally incorporated in an OS on a computer. The Web application is generally developed using a language such as HTML5, CSS, or JavaScript® so as to enable interpretation by the Web browser. These languages are Web standard languages. Thus, once the application is described, it can operate in any environment where the Web browser operates. Japanese Patent Laid-Open No. 2011-233034 discloses an example of the Web application form. The body of the Web application described in HTML5, CSS, or JavaScript resides in a server outside a mobile computer. Since the Web application is downloaded from the server to the mobile computer via Internet connection at the time of use, the user can dynamically change a user interface (UI) design or the like without compiling the application in advance.

It is often the case recently that a mobile computer is equipped with a high-resolution camera. Since the mobile computer is carried daily and includes a memory capable of storing about several thousand photos, the user can casually enjoy photo shooting frequently. Image processing is very important for the user in order to perform filter processing for converting a photo image into, for example, a monochrome or sepia, or solve a problem that a photo is dark or the color balance is poor. The image processing is becoming an indispensable application. It is important in the application that such image processing can be simply provided to the user in a stress-free manner.

Generally, the Web application is executed by JavaScript on a browser or on a server under the security restriction on the browser. Conventionally, JavaScript is described as a script of a character string visually recognizable by a human, and can be executed by compiling the script at the time of the operation, as needed. However, there is a problem that the operation becomes slow when advanced and complicated image processing is described in JavaScript.

When it is built to execute image processing in a server, as in Japanese Patent Laid-Open No. 2011-233034, the time is necessary to upload, to the server via Internet connection, data such as a photo present inside a mobile computer, and download the result after image processing. This is a serious problem to a user who requests stress-free instant processing of the mobile application. In addition, processing in the server cannot be executed offline.

As described above, the native application has an advantage that processing can be performed at high speed. However, the native application needs to be developed separately in different development languages for respective OSs, so the development cost and development time increase. Also, the native application needs to be compiled in advance. It is difficult to, for example, change the UI design of the application at the time of the operation or dynamically add a function. The native application is lack of flexibility.

An application will be examined, in which all or most part of the UI is described in a so-called Web standard language such as HTML5, CSS3, or JavaScript, and a function described in a native language can be used from contents described in the Web standard language. By installing such an application in a mobile computer, a system which implements the advantages of both the Web application and native application can be built on the mobile computer.

For example, a case where a photo print application operates on such a system will be considered. For example, this application superimposes date information such as a shooting date/time on a print target photo, superimposes a stamp image such as a pictorial symbol, and prints the superimposition result by an external printer.

Generally, an application described by a script such as JavaScript has a restriction which inhibits communication with an external device owing to the security restriction. In contrast, a connected external device such as the above-mentioned printer often has a plurality of types for even the setting of the print function, and can execute various functions in addition to the print function. Examples of these functions are maintenance execution for maintaining the print quality, status management, and error notification. The functions change depending on even the printer model. Since an application described by a script, such as a Web application, has a restriction on communication with an external device, it cannot make full use of the functions of the printer.

SUMMARY OF THE INVENTION

An aspect of the present invention is to eliminate the above-mentioned problems with the conventional technology. The present invention provides an information processing apparatus and information processing method for preventing a failure in executing image processing based on communication with an external device in a software arrangement including a script layer, and a storage medium storing a program.

The present invention in one aspect provides an information processing apparatus comprising: a processor; a storage unit configured to store a program having a layered structure including a first layer constituted by a script instruction set which is translated to be able to execute the script instruction set by the processor when executing an application and is executed, and a second layer constituted by an instruction set which is translated in advance to be able to execute the instruction set by the processor, the program executing the application by cooperation between the first layer and the second layer; a request unit configured to, when communicating with a printing apparatus used for a print function of the application, request communication with the printing apparatus of the second layer in the first layer; and a communication unit configured to communicate with the printing apparatus in accordance with the request by the request unit in the second layer.

The present invention can prevent a failure in executing image processing based on communication with an external device in a software arrangement including a script layer.

Further features of the present invention will become apparent from the following description of exemplary embodiments with reference to the attached drawings.

DESCRIPTION OF THE EMBODIMENTS

Figure 1:
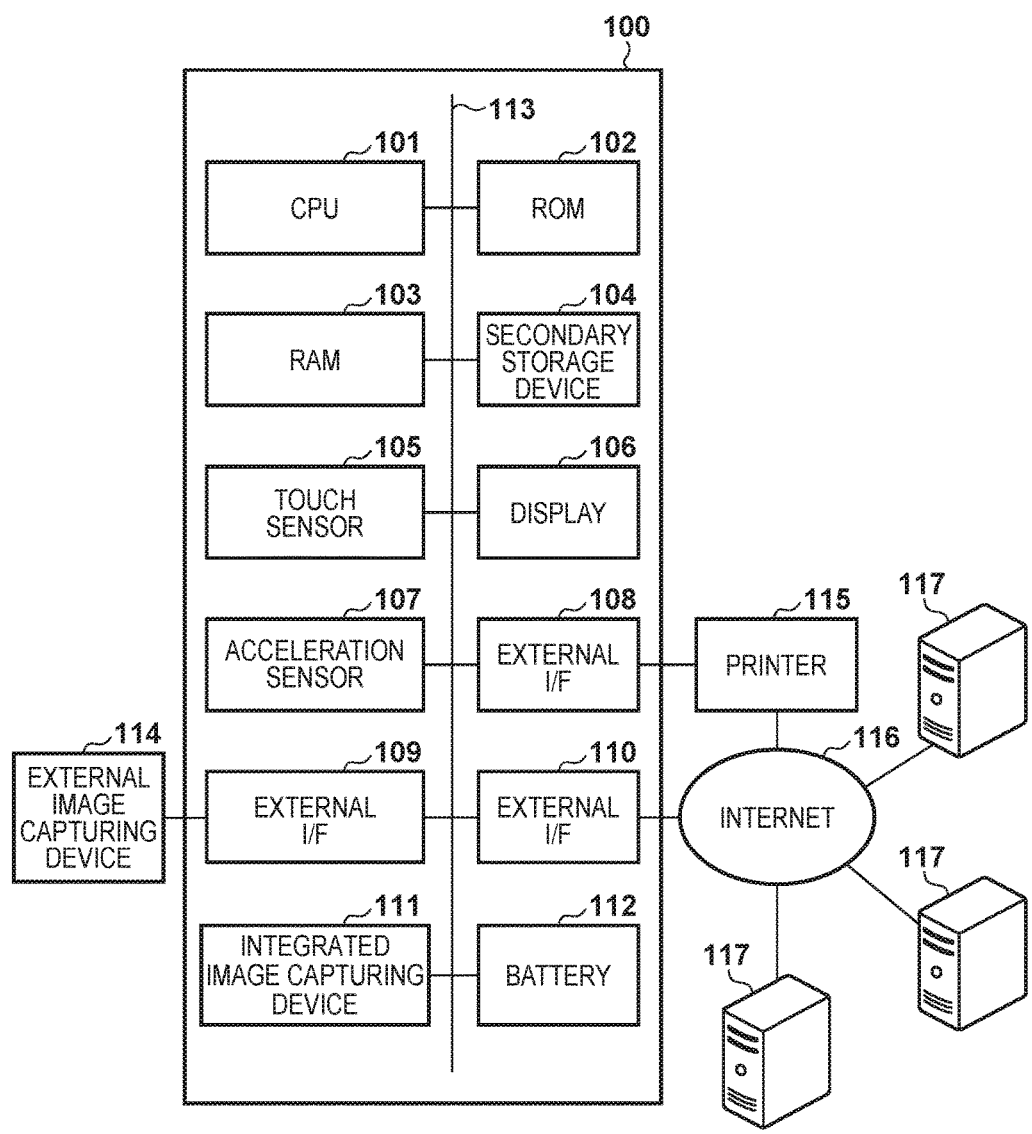
FIG. 1 is a block diagram showing the hardware arrangement of a portable information terminal.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same constituent elements, and a repetitive description thereof will be omitted.

[First Embodiment]

An operation when a photo print application as one Web application operates on a portable information terminal will be explained. The photo print application applies various kinds of image processing (for example, the luminance is corrected and a stamp image is added) to an image selected by the user, and then prints the print target content. Note that the photo print application is provided as a hybrid application to be described later in this embodiment.

[Hardware Arrangement]

FIG. 1 is a block diagram showing an example of the hardware arrangement of an information processing apparatus, particularly, a portable information terminal 100. Referring to FIG. 1, a CPU (Central Processing Unit) 101 reads out a program from a ROM 102 to a RAM 103 and executes it, thereby implementing an operation to be described in each embodiment. The ROM 102 is a computer-readable storage medium that stores a program to be executed by the CPU 101, and the like. The RAM 103 is used as a working memory for temporarily storing various data at the time of, for example, executing a program by the CPU 101. A secondary storage device 104 is, for example, a hard disk or a flash memory, and stores, for example, image files, image data, and a database that holds the processing results of image analysis and the like. A touch sensor 105 is a sensor for detecting a touch operation on a touch panel by the user. A display 106 displays a user interface screen such as a print setting screen on the photo print application, an image processing result, and the like. The display 106 may include the touch sensor 105.

An acceleration sensor 107 is a sensor for detecting an acceleration, and detects the tilt of the portable information terminal 100 or the like. An external interface (I/F) 108 connects the portable information terminal 100 to a printer 115. The portable information terminal 100 can use the external I/F 108 to print by the printer 115. The portable information terminal 100 can also use an external I/F 110 to print by the printer 115 via Internet 116. An external I/F 109 connects the portable information terminal 100 to an external image capturing device (camera) 114. Image data captured by the external image capturing device 114 or an integrated image capturing device 111 is stored in the secondary storage device 104 after predetermined image processing. The external I/F 110 includes a wireless LAN and connects the portable information terminal 100 to the Internet 116. The portable information terminal 100 can use the external I/F 110 to obtain image data and the like from various external servers 117 via the Internet 116. A battery 112 supplies power necessary for the operation of the portable information terminal 100. The units ranging from the CPU 101 to the battery 112 are connected to each other via a system bus (control bus/data bus) 113, and the CPU 101 performs overall control of the respective units.

The portable information terminal may include an external I/F for performing wired connection, such as a USB or a wired LAN. The portable information terminal may include an external I/F for performing wireless connection, such as Bluetooth® or infrared communication, in addition to the wireless LAN. As a connection form by the wireless LAN, for example, devices may be directly connected to each other, or a device may be connected to a communication destination device via a wireless LAN router (not shown).

[Software Arrangement]

Figure 2:
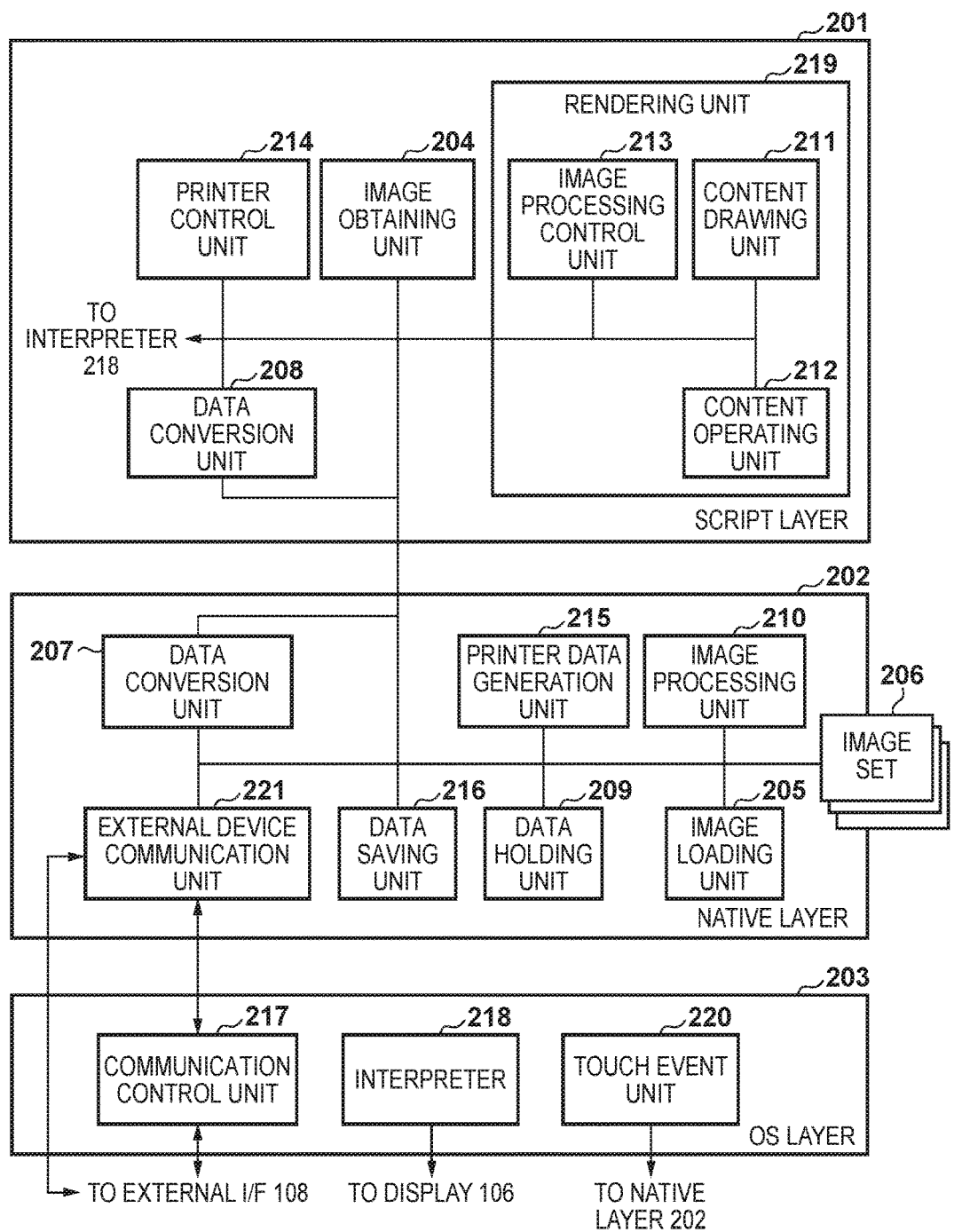
FIG. 2 is a block diagram showing the software arrangement of the portable information terminal.

FIG. 2 is a block diagram showing an example of a software arrangement on the portable information terminal 100 in order to execute the photo print application (to be referred to as the application hereinafter). The CPU 101 implements each block of the software shown in FIG. 2. In this embodiment, the software of the portable information terminal 100 has a three-layered structure of a script layer 201, native layer 202, and OS layer 203. The function of the application is implemented by the cooperation between the respective layers shown in FIG. 2. The script layer 201 describes various instructions (script instruction set) by text data in a Web standard language such as HTML5, CSS (Cascading Style Sheets) 3, or JavaScript. These instructions are instructions such as drawing of a content, display of an image, and replay of a moving image. The script layer 201 holds text data of these instructions. The described script is executed by translating a text instruction set by a processor (the CPU 101) present in an application execution environment. The translation is executed in, for example, a form in which instruction sentences are dynamically translated line by line in every execution, a form in which instruction sentences are translated when the application is activated, or a form in which instruction sentences are translated when the application is installed in the portable information terminal 100. Processing in the script layer 201 and contents in the script layer 201 will also be simply referred to as a script hereinafter. When the instructions of the script are translated in the device (the portable information terminal 100), the interpreter function of the native layer 202 or OS layer 203 to be described later is used. Note that a large portion of the UI of the application is described by the script in this embodiment.

The native layer 202 is a part which executes a processing instruction set translated (compiled) in advance in an environment other than the application execution environment. In the native layer 202, codes described in a high-level language such as C/C++ are compiled in advance on the server or the PC of the application developer into an ensemble of instructions directly interpretable by the CPU 101. Processing in the native layer 202 and contents in the native layer 202, and invocation of the function of the OS layer 203 from the native layer 202 will also be simply referred to as a native hereinafter. Note that another implementation of the native layer 202 is Java. Java is a high-level language similar to C/C++, and is translated in advance into an intermediate code in the development environment at the time of application development. The translated intermediate code operates in the Java virtual environment of each OS. In this embodiment, this form is also one form of the native layer 202.

The OS layer 203 corresponds to the operating system (OS) of the device. The OS layer 203 has an OS-specific function and a role of providing the use of a hardware function to the application. The OS layer 203 includes an API, and the function of the OS layer 203 can be used from the script layer 201 and native layer 202.

In this embodiment, allowing invocation of the function of the native from the script layer 201 will be referred to as binding (or bind). Various native functions include an API, and the script layer 201 can use the native functions by invoking the API. Various OSs incorporate this binding function normally. In this embodiment, an application including both the script layer 201 and native layer 202 will be especially called a hybrid application. In the hybrid application, all or most part of the UI is described in a so-called Web standard language such as HTML5, CSS3, or JavaScript, and a function described in a native language can be used from contents described in the Web standard language. By installing the hybrid application in the portable information terminal 100, a system which implements the advantages of both the Web application and native application can be built on the portable information terminal 100.

Each block in FIG. 2 will be explained below.

Obtainment of Image Data

An image obtaining unit 204 of the script layer 201 requests the native layer 202 to obtain image data. There are a plurality of obtainment request methods, including, for example, an absolute path designation method of designating the existence location of a file itself, and a method of prompting display of a dialog. Based on the obtainment request from the image obtaining unit 204, an image loading unit 205 of the native layer 202 obtains image data from an image set 206 of the native layer 202 serving as an area where image data are held. The method of obtaining image data from the image set 206 changes depending on the request method of the image obtaining unit 204. For example, the image loading unit 205 directly obtains image data based on the absolute path of a file, or obtains image data based on selection on a dialog display.

A data conversion unit 207 of the native layer 202 converts data in the native layer 202 into a data format usable in the script layer 201. In contrast, the data conversion unit 207 converts data sent from the script layer 201 into a data format usable in the native layer 202. A data conversion unit 208 of the script layer 201 converts data in the script layer 201 into a data format usable in the native layer 202. To the contrary, the data conversion unit 208 converts data sent from the native layer 202 into a data format usable in the script layer 201. In this embodiment, for example, image data obtained by the image loading unit 205 of the native layer 202 is converted into the base64 data format usable in the script layer 201, and the converted data is transferred to the script layer 201.

Loading/Saving of Image Data

A data holding unit 209 of the native layer 202 holds image data loaded by the image loading unit 205 and image data having undergone image processing by an image processing unit 210. The held image data is rasterized into RGB image data. Image processing can therefore be immediately executed on the image data which has been loaded by the image loading unit 205 and held. The stored image data is paired with an ID generated by the image obtaining unit 204 of the script layer 201. When obtaining the image data from the data holding unit 209, the ID is designated.

The data saving unit 216 of the native layer 202 stores, in the image set 206, image data held in the data holding unit 209, as needed. The data saving unit 216 is sometimes used to save stamp images prepared by the application, and temporary files.

Output

A rendering unit 219 of the script layer 201 is a block for creating a script about rendering of an output (display/print) target image. The rendering unit 219 includes a content drawing unit 211, a content operating unit 212, and an image processing control unit 213. In this embodiment, the display 106 does not display an image during script creation by the rendering unit 219. The content drawing unit 211 describes a print target content in a Web standard language. The content operating unit 212 of the script layer 201 reflects an operation to an image in the script. Examples of the operation to an image are enlargement, movement, and rotation of an image. The description by the content drawing unit 211 also reflects a content operated by the content operating unit 212. The script of the described content is interpreted by an interpreter 218 of the OS layer 203 to be described later, and displayed on the display 106. The image processing control unit 213 decides a correction parameter (for example, a luminance correction value) used in image processing, and a correction target image. If necessary, the data conversion unit 208 of the script layer 201 converts these data into a data format usable in the native layer 202, and transfers the converted data to the native layer 202.

The image processing unit 210 of the native layer 202 executes image processing (for example, luminance correction) on image data designated by the image processing control unit 213 of the script layer 201. At this time, image processing to be executed is decided in accordance with a correction parameter set by the image processing control unit 213. As for designation of image data, for example, there is a method of receiving the path of image data from the script layer 201.

A touch event unit 220 of the OS layer 203 obtains information about a touch on the display 106 by the user. The information about a touch includes, for example, detection of a touch on the display, and touched position information. The obtained data is transmitted to the content operating unit 212 of the script layer 201 via the native layer 202. For example, information about selection of a desired stamp image on the display 106 by the user is transmitted by the touch event unit 220 to the content operating unit 212 of the script layer 201 via the native layer 202.

The interpreter 218 of the OS layer 203 is a block which interprets/executes a script instruction generated in the script layer 201 and described in the Web standard language. An image drawing instruction or the like is interpreted by the interpreter 218, and display on the display 106 is executed. The interpreter 218 translates a print content drawn in the script layer 201, renders the image data at a print resolution, and outputs the image data as RGB pixel values. The interpreter 218 is constituted in the OS layer 203 in FIG. 2, but may be constituted in the native layer 202.

Communication with Printer

A printer control unit 214 of the script layer 201 controls a rendering start request, a printer detection request, display of a printer setting screen, and generation and transmission of print information. Here, rendering is creation of bitmap data necessary for printing. In the printer setting screen, settings such as a paper size, paper type, and color/monochrome printing are possible. A printer data generation unit 215 of the native layer 202 generates print information based on the items set in the printer setting screen.

Based on the request from the printer control unit 214 of the script layer 201, the printer data generation unit 215 of the native layer 202 generates a command and data necessary for printer communication. The data necessary for printer communication is data complying with a communication protocol, and the command is data for deciding the operation of the printer such as printing or scanning. A communication control unit 217 of the OS layer 203 is an interface for transmitting data received from the printer data generation unit 215 to the connected printer 115.

An external device communication unit 221 of the native layer 202 is an interface for communicating with a connected external device such as a printer. The external device communication unit 221 transmits data received from the printer data generation unit 215, and receives information from the printer 115. The external device communication unit 221 communicates with the printer 115 via the communication control unit 217 of the OS layer 203 in this embodiment, but may directly transmit data to the external I/F 108. When the communication control unit 217 supports a communication protocol used by an external device, the external device communication unit 221 and the communication control unit 217 perform communication data processing complying with this communication protocol. To the contrary, when the communication control unit 217 does not support a communication protocol used by an external device, the external device communication unit 221 performs communication data processing complying with this communication protocol.

[Overall Sequence]

Figure 3:
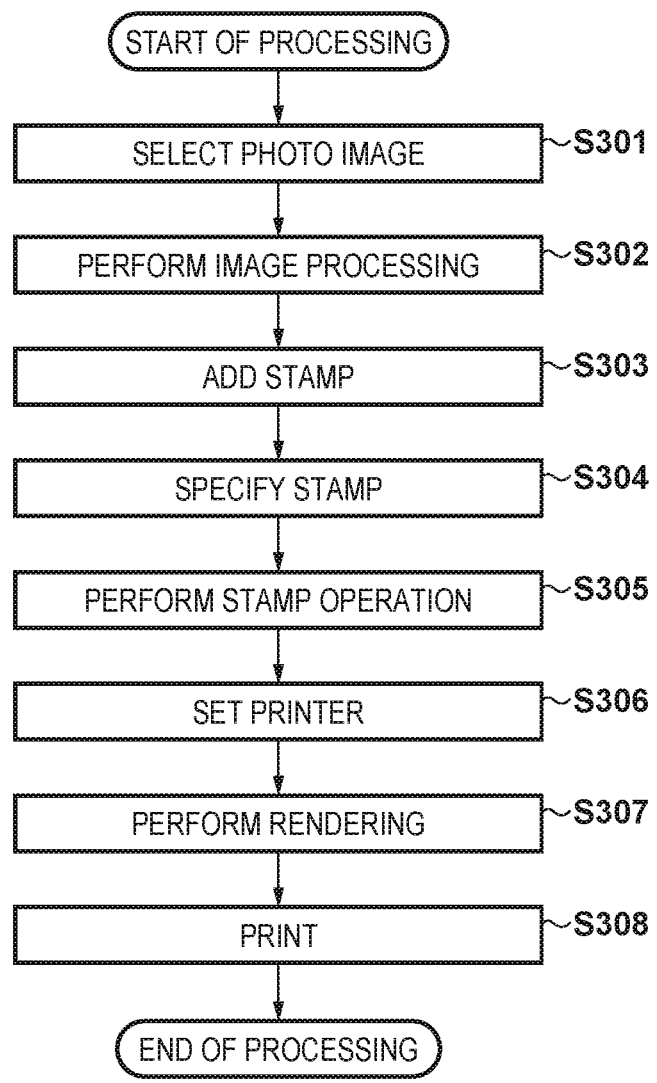
FIG. 3 is a flowchart showing the procedures of overall photo print processing.
Figure 12:
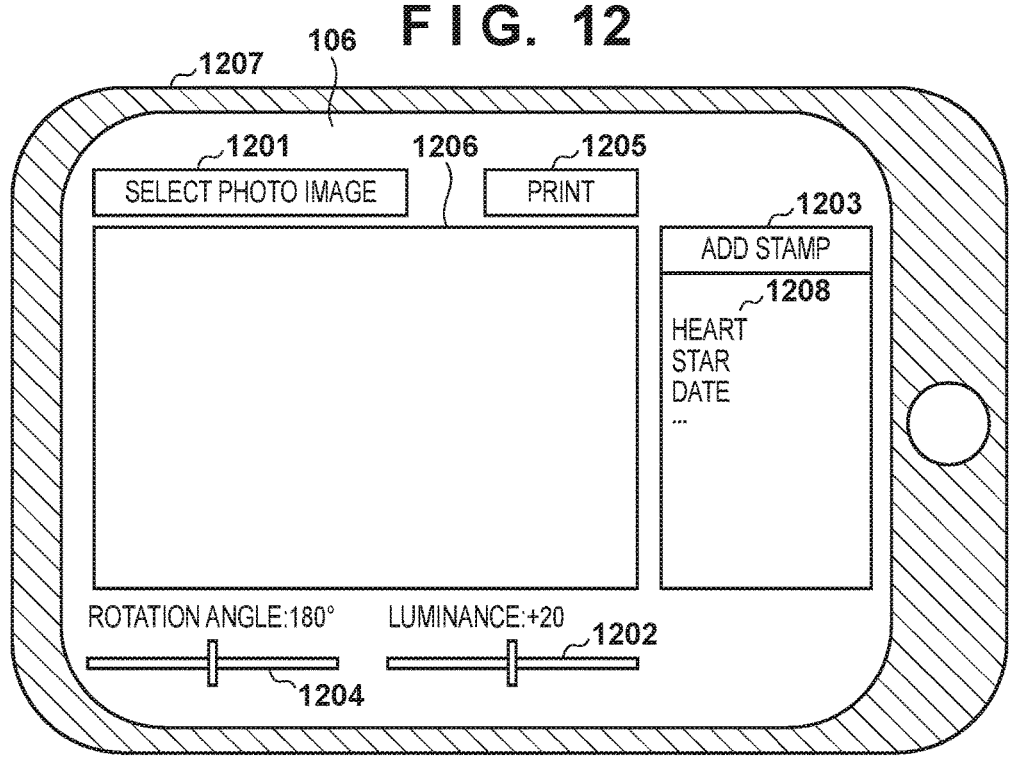
FIG. 12 is a view showing an example of a photo print application screen.

FIG. 3 is a flowchart showing the procedures of overall photo print processing according to this embodiment. The processing in FIG. 3 is implemented by, for example, reading out a program from the ROM 102 to the RAM 103 and executing it by the CPU 101. FIG. 12 is a view showing an example of a photo print application screen described by a script according to this embodiment.

In step S301, the CPU 101 detects pressing (including even a touch operation: this also applies to the following description) of a photo image selection button 1201 by the user, and accepts selection of an image. Upon accepting the selection of the image, the CPU 101 displays the selected image in an entire drawing area 1206.

In step S302, the CPU 101 detects a correction parameter (for example, a luminance correction value) which has been set by the user using a slide bar 1202 and is used at the time of image processing. The CPU 101 executes image processing on the image in accordance with the detected correction parameter, and displays the image in the entire drawing area 1206.

In step S303, if the CPU 101 detects pressing of a stamp addition button 1203 by the user, it displays a list of stamp images. The CPU 101 accepts selection of a desired stamp image by the user, and adds and displays the stamp image in the drawing area 1206.

In step S304, the CPU 101 detects a stamp image specifying operation by the user. Specifying of a stamp image is processing of determining a touch of a stamp image based on a coordinate point touched on the display 106 and the coordinate point of the stamp image. When the stamp image is specified, it changes to the operation acceptance state. The operation acceptance state is a state in which when an instruction about a stamp image operation (for example, swipe) is issued, the stamp image can be operated (can be swiped) in accordance with this instruction. When there is no stamp image in the operation acceptance state, nothing occurs even if an instruction about a stamp image operation is issued.

In step S305, the CPU 101 accepts a stamp image operation by the user. For example, when the user operates a slide bar 1204 in FIG. 12, the CPU 101 rotates the stamp image in the operation acceptance state in accordance with this operation.

Figure 13:
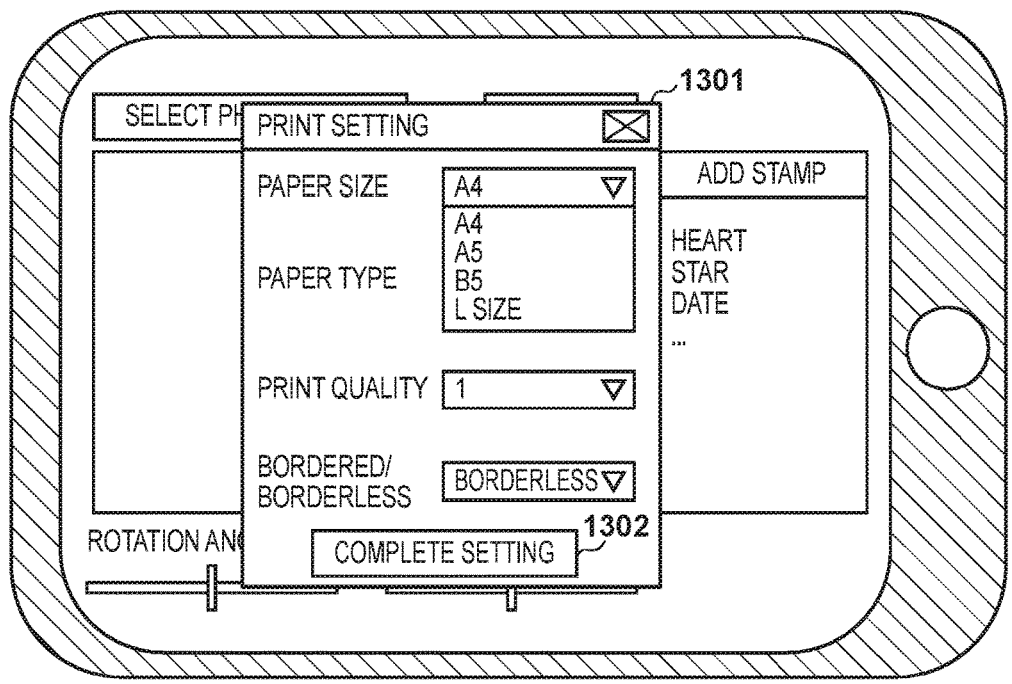
FIG. 13 is a view showing an example of the setting UI of a printer.

In step S306, if the CPU 101 detects pressing of a print button 1205 by the user, it displays a setting UI of information necessary for printing on the display 106. The information necessary for printing includes, for example, a paper size, double-sided, and monochrome/color printing. FIG. 13 shows an example of the setting UI of the printer.

In step S307, if the CPU 101 detects pressing of a setting completion button 1302 by the user, it starts rendering to create bitmap data necessary for printing. The CPU 101 creates image data at a print resolution for the image displayed in the drawing area 1206.

In step S308, the CPU 101 transmits the image data created at the print resolution in step S307 to the printer 115 together with a printer control command, and controls the printer 115 to output a printed product.

Although a minimum sequence has been described above for descriptive convenience, the present invention is not limited to the above-described processing sequence. A detailed operation in each step will be explained below.

[Photo Image Selection]

Figure 4:
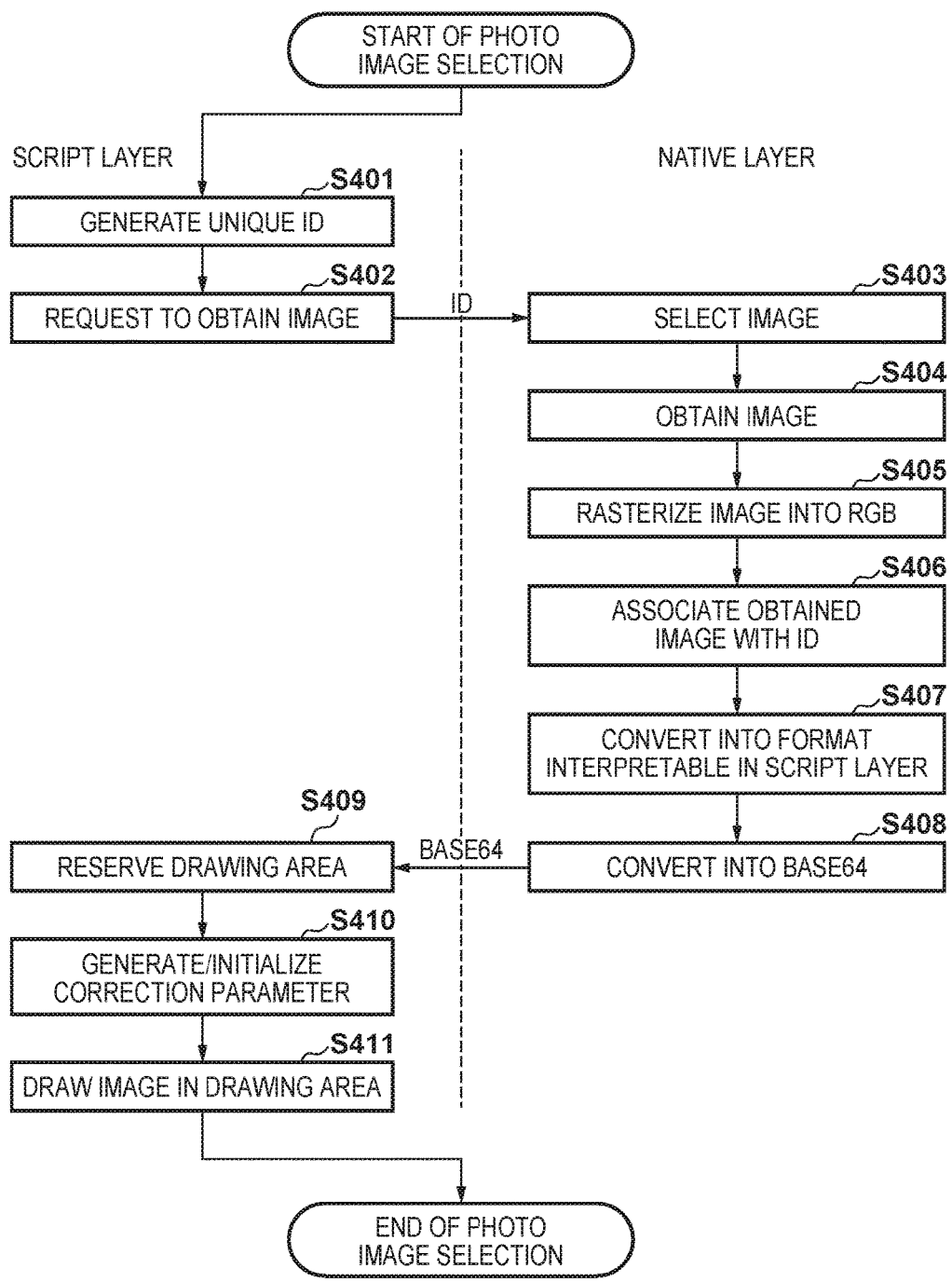
FIG. 4 is a flowchart showing photo image selection processing in step S301.

As described above, when pressing of the photo image selection button 1201 by the user is detected, the processing in step S301 starts. FIG. 4 is a flowchart showing the photo image selection processing in step S301. Steps S401, S402, and S409 to S411 in FIG. 4 are processes to be executed by the script layer 201, and steps S403 to S408 are processes to be executed by the native layer 202. The same illustration applies to other flowcharts.

In step S401, the image obtaining unit 204 of the script layer 201 generates a unique ID for identifying image data to be obtained. The ID may take any form such as a numerical value or a character string as long as it can be transmitted from the script layer 201 to the native layer 202.

In step S402, the image obtaining unit 204 of the script layer 201 transfers the ID to the native layer 202, and requests image selection. As the request method, the script layer 201 may directly invoke an image selection API unique to the native layer 202. When the image selection API unique to the native layer 202 cannot be directly invoked, a wrapper may be prepared in the native layer 202. The wrapper is a method of preparing in advance in the native layer 202 a function which can be invoked from the script layer 201, and invoking the function unique to the native layer 202 within the native function. The image selection API has a mechanism of transferring an ID as, for example, an argument. With this arrangement, the script layer 201 can transfer the ID to the native layer 202.

In step S403, the native layer 202 performs display control to display a device-specific image selection UI on the display 106. The image loading unit 205 accepts selection of an image on the displayed image selection UI by the user. The selection of an image may be selection of an image in a removable storage medium or selection of image data captured using the camera function of the portable information terminal 100.

In step S404, the image loading unit 205 of the native layer 202 obtains image data corresponding to the selected image from the image set 206. The image data is obtained by, for example, downloading or copying an image file. The file is opened in accordance with a language used in the native layer 202.

In step S405, the data holding unit 209 of the native layer 202 rasterizes the obtained image data into RGB data. The image data is held as RGB data in this embodiment, but is not limited to this. For example, bitmap data may be held in, for example, a JPEG (Joint Photography Expert Group), PNG (Portable Network Graphics), or RGBA format. The RGBA format is a data format obtained by combining A representing transparency with R, G, and B (Red, Green, and Blue) of image data.

In step S406, the data holding unit 209 of the native layer 202 stores the rasterized RGB data in association with the ID received in step S403. As the association method, for example, an object having the ID and RGB data is created to make it possible to specify the RGB data by the ID. The association between the ID and the RGB data is not limited to pairing the ID and the RGB data. For example, a method of associating the ID and the path of the RGB data may be used. Alternatively, a method of associating the first address of RGB data, or associating a function of invoking RGB data may be used.

In step S407, image data convertible into a format supported by the script layer 201 is generated based on the RGB data obtained in step S405. In this embodiment, for example, image data in the JPEG format is generated. The conversion from RGB data into JPEG data uses an encoder included in the OS.

In step S408, the data conversion unit 207 of the native layer 202 converts the JPEG data into base64 data. This is because neither the RGB data array nor the JPEG binary data can be used intact in the script layer 201, and the data needs to be converted into a format usable in the script layer 201. This embodiment assumes that, when JavaScript® is used, image data handled in the script layer 201 has the base64 format. base64 is an encoding method for handling binary data as character string data.

In step S409, the data conversion unit 208 of the script layer 201 receives the base64 data converted in step S408 from the data conversion unit 207 of the native layer 202. Then, an area for displaying the base64 data is reserved in the RAM 103. In this embodiment, for example, the canvas function of the HTML is used to reserve the memory, and the API of the Context object of the canvas is used to draw an image.

In step S410, the image processing control unit 213 of the script layer 201 generates and initializes a correction parameter. The correction parameter is an object holding parameters that decide the contents of image processing in step S302. Image processing to be executed in the native layer 202 is decided in accordance with the correction parameter. For example, the following correction parameter is generated by JavaScript:

```
var CorrectionParam = function( ){
  this.brightness = 0;
}
```

This correction parameter represents that a variable name "brightness" for brightness correction is stored in a CorrectionParam object and a value of 0 is stored in brightness. For descriptive convenience, the correction parameter is only for brightness correction. However, types of image processing can be added by adding parameters for other correction processes.

In step S411, the image processing control unit 213 of the script layer 201 designates base64 data received from the native layer 202 as data to be drawn in the drawing area 1206. The interpreter 218 of the OS layer 203 can therefore interpret the script to display the image in the drawing area 1206. An example of a code for reflecting the base64 data in the drawing area 1206 is:

```
var base64Data = base64 data from the native
var canvas = document.createElement("canvas");//reserve
the drawing area of an image
canvas.setAttribute("width", 100);//set the size of the
drawing area
canvas.setAttribute("height", 100);
var context = canvas.getContext("2d");//generate an
object which is drawn in the drawing area and has an
API
var img = new Image( );//generate an Image object
img.src = base64Data;//set the URI of the image as the
received base64 data
img.onload = function( ){//start processing after the
end of loading the image
    context.drawImage(img, 0, 0);//draw the image in
the drawing area using the method of a context object
    document.getElementById("div").appendChild(canvas
);}
```

This embodiment uses a layered structure of canvases. When an operation such as drawing, movement, or enlargement is specified, these canvases are sequentially added to the drawing area 1206 designated by div. Normally, each canvas is handled as one image, and when a stamp image or the like is added after drawing a photo image on the canvas, the photo image and the stamp image are combined into one image. To the contrary, since canvases are superimposed and displayed using the layered structure in this embodiment, they are displayed as one image to the user, but actual drawing products are independent of each other.

[Image Processing]

Figure 5:
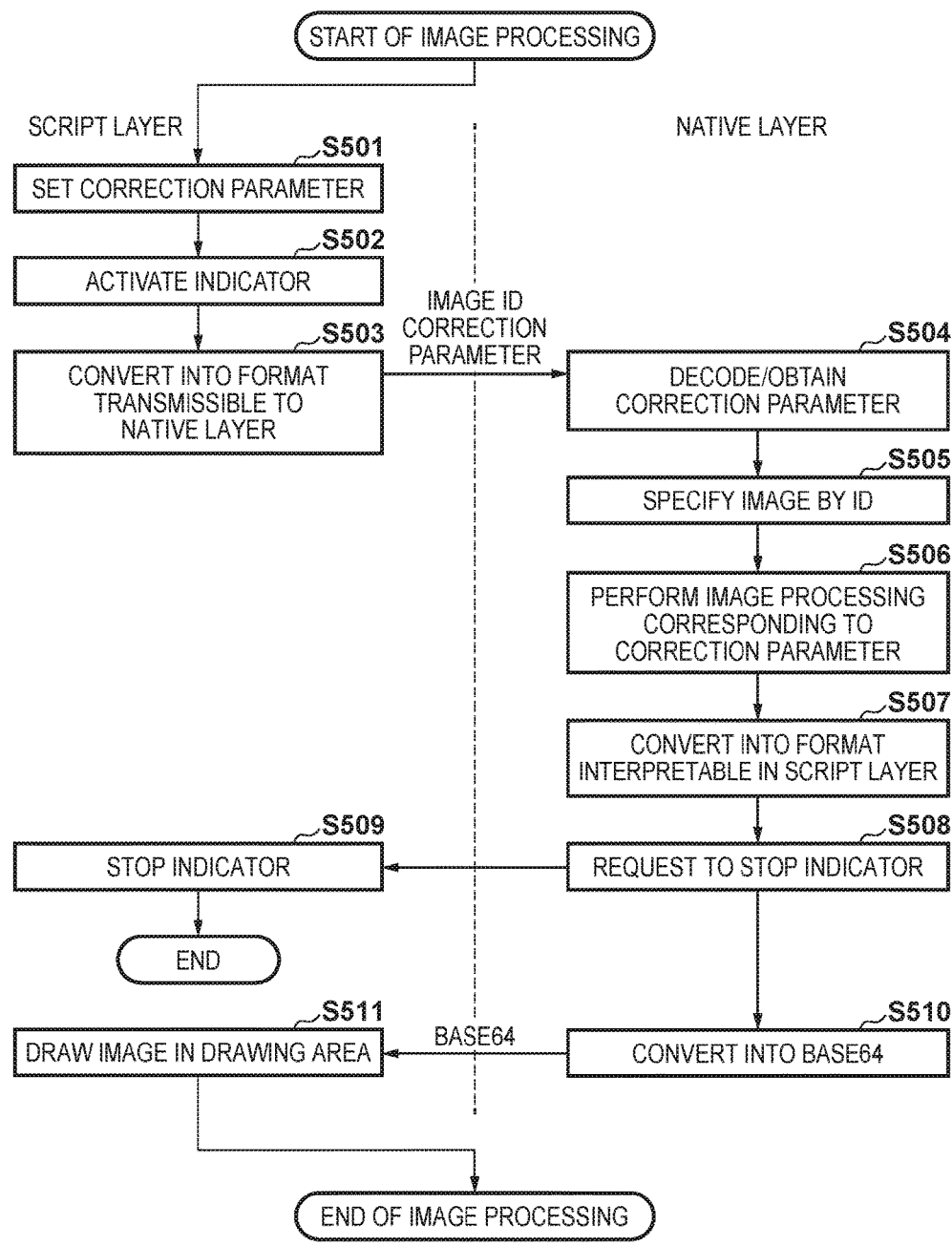
FIG. 5 is a flowchart showing image processing in step S302.

When setting of the slide bar 1202 by the user is detected, the processing in step S302 of FIG. 3 starts. FIG. 5 is a flowchart showing the image processing in step S302.

In step S501, the image processing control unit 213 of the script layer 201 updates the value (for example, brightness: this also applies to the following description) of the correction parameter generated in step S410 into a value set by the slide bar 1202.

In step S502, the image processing control unit 213 of the script layer 201 performs processing of activating an indicator, and displaying it on the display 106. The indicator is an icon which is displayed on the display 106 during data processing and represents a working state. The indicator is displayed by graphics such as a progress bar, a clock mark, or flickering or rotation of figure.

In step S503, the data conversion unit 208 of the script layer 201 converts the correction parameter into a JSON character string usable in the native. This is because the correction parameter has the object format, as described above, and cannot be interpreted by the native layer 202. The converted JSON character string is transferred to the native layer 202 together with the ID for identifying the image data generated in step S401.

In step S504, the image processing unit 210 of the native layer 202 parses (analyzes and decodes) the JSON data received as the character string. Parsing uses a parser included in the OS.

In step S505, the image processing unit 210 of the native layer 202 specifies the image data (RGB data) rasterized into RGB data in step S405 based on the ID transmitted from the script layer 201. As described above, the association between the ID and the image data is not limited to pairing the ID and the image data, as described above. For example, the association may be performed by a method of associating the ID and the path of the image data. Alternatively, the association may be performed by a method of associating the ID and the first address of the image data, or a method of associating the ID and a function of invoking image data.

In step S506, the image processing unit 210 of the native layer 202 decides image processing to be executed based on the obtained correction parameter, and performs the image processing corresponding to the correction parameter on the image data specified in step S505.

In step S507, image data convertible into a format supported by the script layer 201 is generated based on image data having undergone the image processing in step S506. In this embodiment, for example, JPEG image data is generated.

In step S508, the image processing unit 210 of the native layer 202 requests the script layer 201 to stop the indicator. This is performed by invoking an indicator stop function defined in the script layer 201 from the native layer 202.

In step S509, the image processing control unit 213 of the script layer 201 stops the indicator, and stops display on the display. In step S510, the data conversion unit 207 of the native layer 202 converts the JPEG data into base64 data, and transmits the base64 data to the script layer 201.

In step S511, the data conversion unit 208 of the script layer 201 receives the base64 data converted in step S510 from the native layer 202. Then, the image processing control unit 213 of the script layer 201 designates the base64 data received from the native layer 202 as data to be drawn in the drawing area 1206. Accordingly, the interpreter 218 of the OS layer 203 interprets the script, and the image having undergone the image processing is displayed in the drawing area 1206.

Although this embodiment has described that image processing starts in response to a change of the slide bar 1202, the present invention is not limited to this form. Another example is a form in which plus and minus buttons are arranged on the screen and the brightness is adjusted every time the user presses the buttons. Still another example is a form in which image processing is synchronized with a touch event by the user such that the brightness is increased when right half of an image is touched or decreased when its left half is touched. A form is also possible, in which only the correction parameter is changed by a user operation, and all image processes are performed at once upon accepting an image processing execution instruction.

[Stamp Image Addition]

Figure 6:
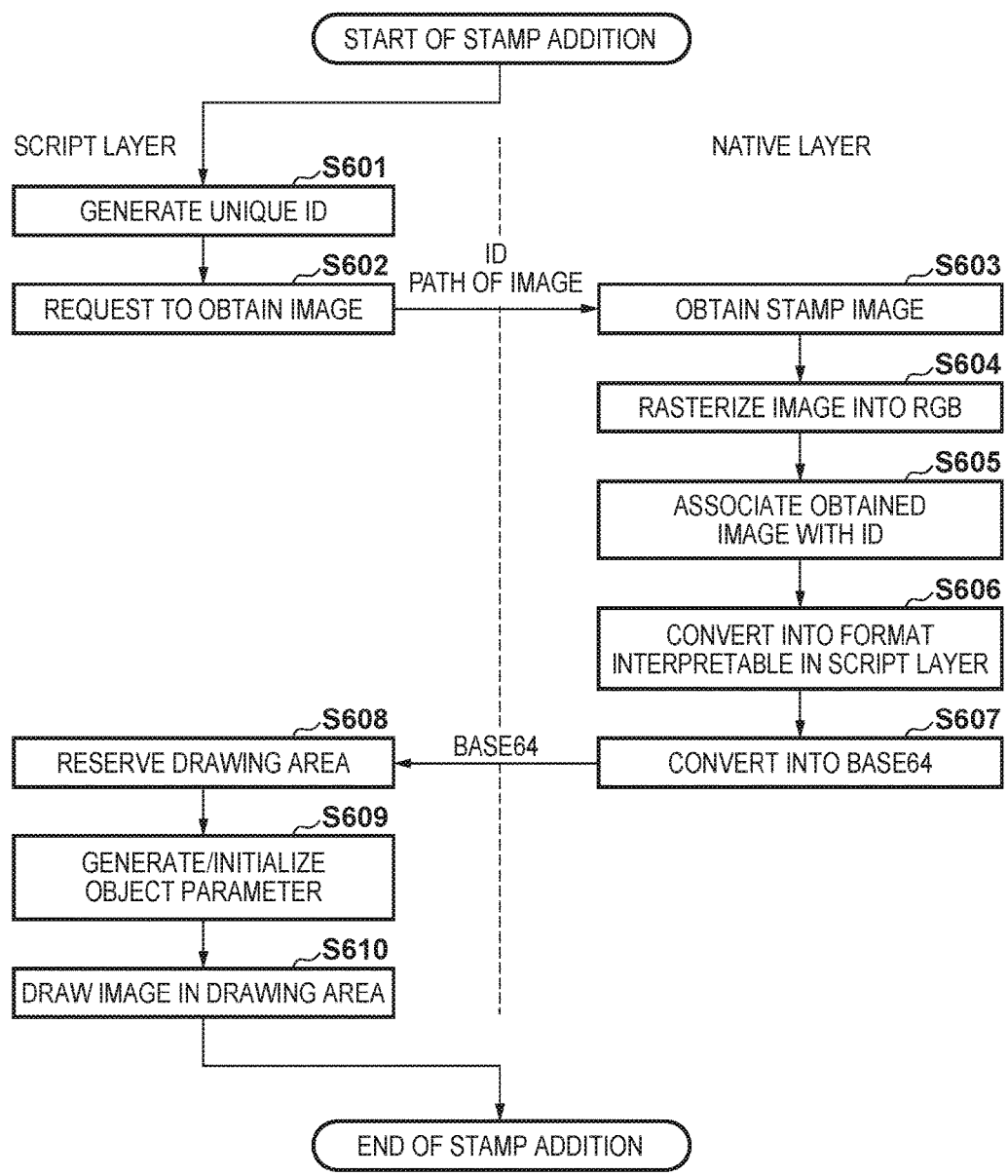
FIG. 6 is a flowchart showing stamp image addition processing in step S303.

When pressing of the stamp addition button 1203 by the user is detected and selection of a heart stamp image 1208 is detected, the processing in step S303 starts. FIG. 6 is a flowchart showing the stamp image addition processing in step S303.

In step S601, the image obtaining unit 204 of the script layer 201 generates a unique ID for identifying a stamp. This ID can take any form such as a numerical value or a character string as long as it can be transmitted from the script layer 201 to the native layer 202.

In step S602, the image obtaining unit 204 of the script layer 201 transmits the ID generated in step S601 and the absolute path of an image to be used as a stamp image to the native layer 202, and requests obtainment of the image.

In step S603, the image loading unit 205 of the native layer 202 obtains the image data by a device-specific API based on the absolute path of the image received from the script layer 201.

In step S604, the data holding unit 209 of the native layer 202 rasterizes the obtained image data into RGB image data and holds it.

In step S605, the data holding unit 209 of the native layer 202 stores the rasterized RGB image data and the ID received in step S602 in association with each other, as in step S406.

In step S606, image data convertible into a format supported by the script layer 201 is generated based on the RGB data obtained in step S604. In this embodiment, for example, JPEG image data is generated. The conversion from RGB data into JPEG data uses an encoder included in the OS.

In step S607, the data conversion unit 207 of the native layer 202 converts the JPEG data into base64 data, and transmits the base64 data to the script layer 201.

In step S608, the data conversion unit 208 of the script layer 201 receives the base64 data converted in step S607 from the native layer 202. An area for displaying the base64 data is reserved in the RAM 103. For example, the HTML canvas function is used to reserve the memory.

In step S609, the image processing control unit 213 of the script layer 201 generates and initializes an object parameter. The object parameter is an object for holding parameters to be used at the time of drawing. For example, the following object parameter is generated by JavaScript:

```
var ObjectParam = function( ){
    this.theta = 0;
    this.posX = 10;
    this.posY = 10;
    this.width = 100;
    this.height = 100;
}
```

This object parameter represents that a variable name "theta" indicating a rotation angle is included in an ObjectParam object, and a value of 0 is stored in theta. Similarly, this object parameter represents that a variable name "posX" indicating an x-coordinate from a reference point is included and a value of 10 is stored in posX. This reference point is the upper left coordinate point of the drawing area 1206. Similarly, posY represents a y-coordinate when the upper left corner of the drawing area 1206 is set as the reference point, width represents the lateral width of the drawing area of a stamp image, and height represents the longitudinal width of the drawing area of the stamp image.

That is, the object parameter corresponds to a drawing product object in this embodiment. In this embodiment, the size, position, and image data of a drawing product are used as the object parameter for descriptive convenience. However, other parameters (for example, translation amount and enlargement magnification) may be added and used at the time of drawing, rendering, or an object operation. Even the information holding method for the drawing object is not limited to this embodiment.

In step S610, the image processing control unit 213 of the script layer 201 designates the base64 data received from the native layer 202 as data to be drawn in the drawing area 1206. The interpreter 218 of the OS layer 203 interprets the script, and the image can be displayed in the drawing area 1206 based on the object parameter initialized in step S609.

Although one stamp image is handled in this embodiment for descriptive convenience, a plurality of stamp images may be handled. In addition, image data prepared in advance is used as a stamp image in this embodiment. However, a method of generating a drawing product by the script using the Context object of a canvas may be used. In this case, in step S602, a drawing product generated using the Context object is transmitted to the native layer 202, and the data holding unit 209 holds the drawing product as RGB data.

[Specifying of Stamp Image]

Upon detecting a tap operation on the display 106 by the user after adding a stamp image in step S303, the stamp image specifying processing in step S304 starts. The tap operation is a touch operation of pressing the display 106 by the finger of the user. This is equivalent to "click" in a PC.

Figure 7:
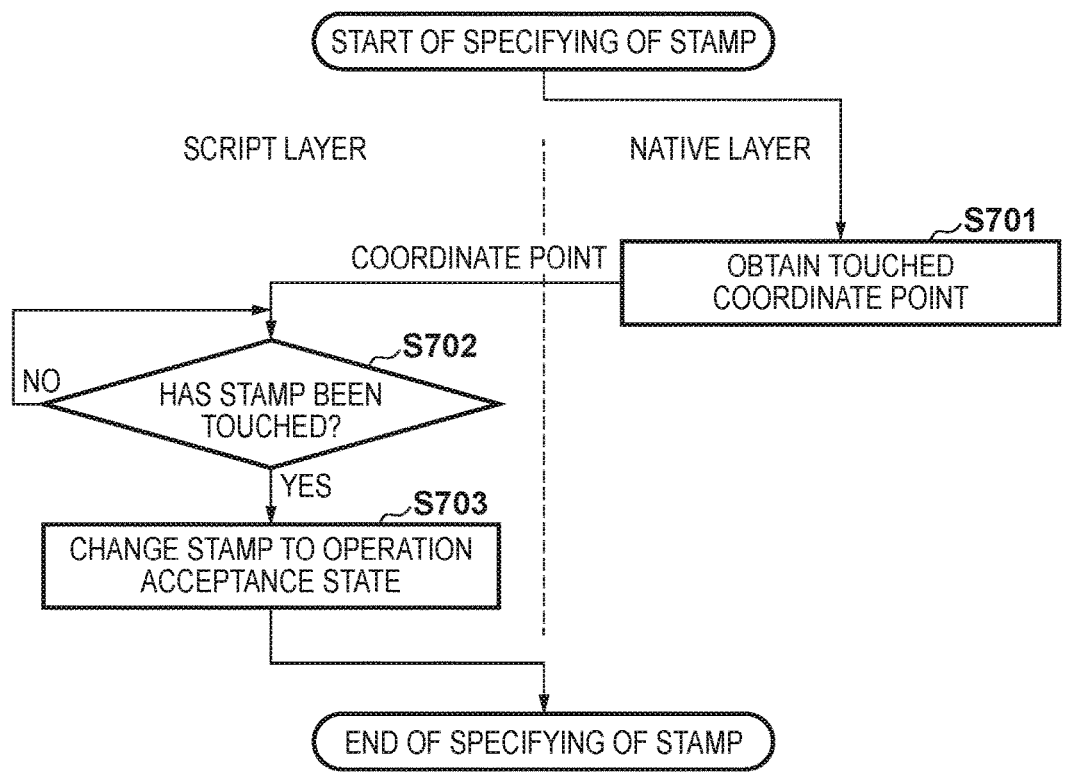
FIG. 7 is a flowchart showing stamp image specifying processing in step S304.

FIG. 7 is a flowchart showing the stamp image specifying processing.

In step S701, the image processing unit 210 of the native layer 202 obtains the coordinate point of the tap via the touch event unit 220 of the OS layer 203, and transmits it to the script layer 201.

In step S702, the content operating unit 212 of the script layer 201 determines, from the coordinate point sent from the native layer 202 and information of the object parameter generated in step S609, whether a stamp image has been touched. Since the object parameter of the stamp image remains unchanged from its initial value, the stamp image is drawn in a square area having upper left vertex coordinates of (10, 10) and lower right vertex coordinates of (110, 110). That is, if x- and y-coordinates sent in step S701 fall within the range of the square area, it is determined that the stamp image has been touched. For example, if a value obtained by subtracting the x-coordinate of the drawing area 1206 from the x-coordinate transmitted in step S701 falls within the range of 0 to 100, and a value obtained by subtracting the y-coordinate of the drawing area 1206 from the transmitted y-coordinate falls within the range of 0 to 100, it is determined that the stamp image has been touched. If there are a plurality of stamp images, the determination is made sequentially from a stamp image displayed in an upper layer, and when a stamp image is specified, the determination processing ends. If it is determined that the stamp image has been touched, the stamp image changes to a state in which an operation to the stamp image is accepted.

In step S703, the content operating unit 212 of the script layer 201 changes the stamp image to the operation acceptance state. The operation acceptance state is a state in which when an instruction about a stamp image operation (for example, swipe) is issued, the stamp image can be operated (can be swiped) in accordance with this instruction. When there is no stamp image in the operation acceptance state, nothing occurs even if an instruction about a stamp image operation is issued. The ID of the stamp image in the operation acceptance state is temporarily stored as the ID of a stamp image of interest in the script layer 201. Thus, the script layer 201 can uniquely specify the stamp image stored in the native layer 202.

[Stamp Image Operation]

Figure 8:
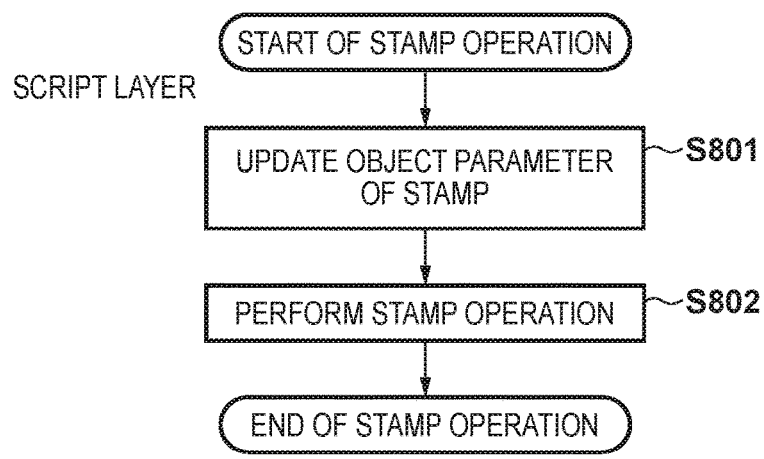
FIG. 8 is a flowchart showing stamp image operation processing in step S305.

When the operation of the slide bar 1204 by the user is detected, the processing in step S305 starts. FIG. 8 is a flowchart showing the stamp image operation processing in step S305.

In step S801, the content operating unit 212 of the script layer 201 updates the object parameter value (for example, rotate) of the stamp image into a value set by the slide bar 1204.

In step S802, the content operating unit 212 of the script layer 201 draws again, in the drawing area 1206 using the object parameter, the stamp image which has changed to the operation acceptance state in step S703. For example, when the stamp image is drawn using the HTML canvas, the image in the canvas can be rotated suing the rotate method of the Context object of the canvas.

Although the operation to the stamp image is rotation in the above description, it may be an operation such as enlargement/reduction or translation. If it is configured to add an object parameter to a photo image, the same operation as the operation to the stamp image becomes possible.

[Printer Setting]

Figure 9:
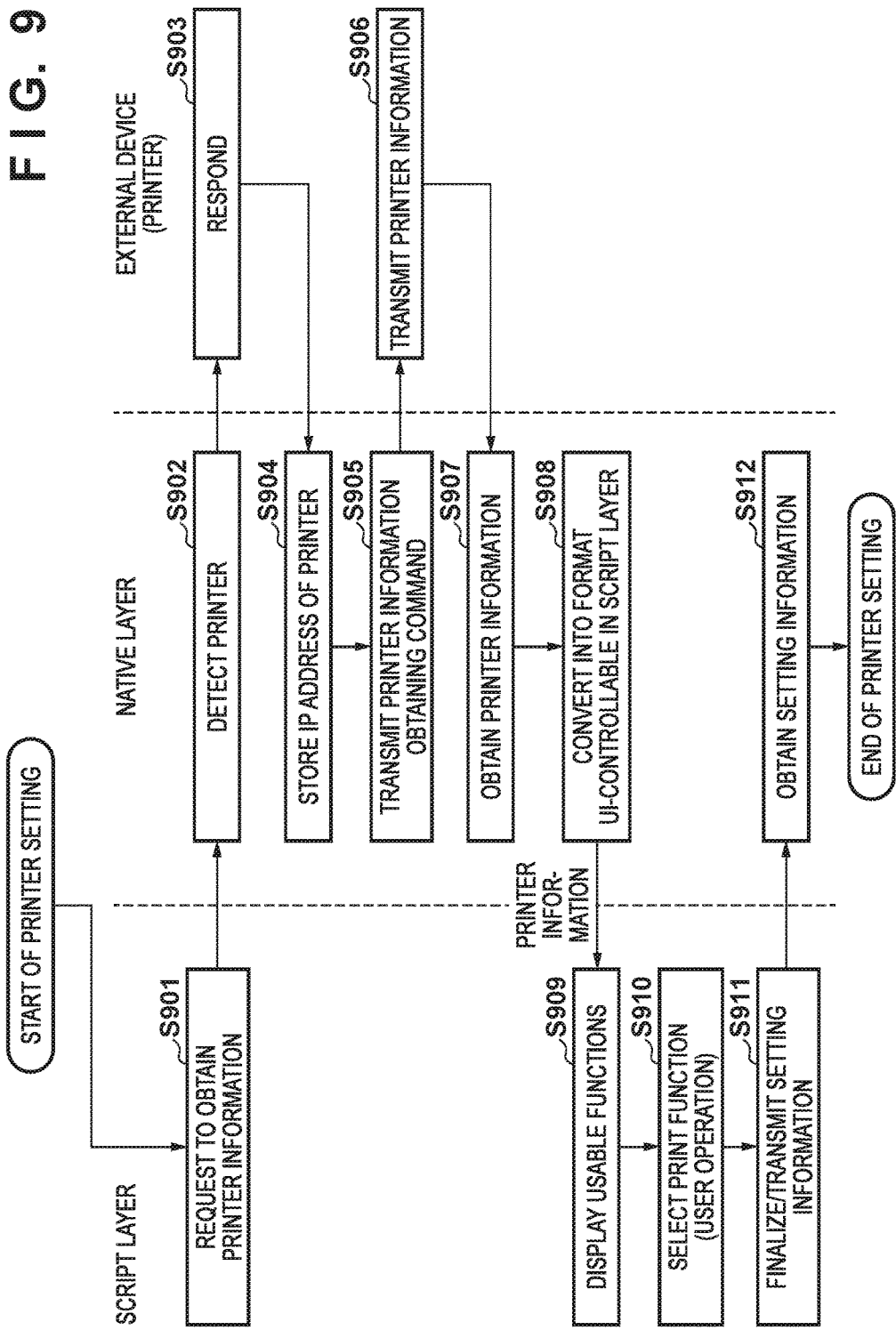
FIG. 9 is a flowchart showing printer setting processing in step S306.

When pressing of the print button 1205 by the user is detected, the processing in step S306 starts. FIG. 9 is a flowchart showing the printer setting processing in step S306.

In step S901, the printer control unit 214 of the script layer 201 requests the native layer 202 to obtain printer information. As the request method, for example, an API unique to the native layer 202 is invoked from the script layer 201 by using the binding function. In this case, a function which can be directly invoked from the script layer 201, or a so-called wrapper of indirectly invoking the function is prepared in advance in the native layer 202. For example, a GetPrinterInfo native function is prepared and invoked from the script layer 201.

In general, direct communication with an external device from the script layer 201 is impossible owing to the security restriction because, for example, it is difficult to guarantee confidential information. In this embodiment, the script layer 201 temporarily requests communication of the native layer 202, and then communicates with the external device via the native layer 202. The native layer 202 communicates with the external device via the function of the OS layer 203.

In step S902, if a corresponding function is invoked, the printer data generation unit 215 of the native layer 202 performs detection, that is, so-called discovery of the printer 115. To detect the communicable printer 115, a protocol such as Bonjour is used. The detection of the printer 115 is performed in, for example, a printer connected by the same wireless LAN router. A response request is issued to the printer 115 by a method such as broadcasting or multicasting in accordance with this protocol.

In step S903, upon receiving the response request, the printer 115 responds to the portable information terminal 100.

In step S904, the native layer 202 stores the IP address of the printer 115 that has responded by the method such as broadcasting or multicasting.

In step S905, the printer data generation unit 215 of the native layer 202 generates a command for requesting the IP address of the printer 115 that has responded in step S903, to provide printer information. If a plurality of printers have responded, the printer data generation unit 215 requests all the printers to provide information. The command is an instruction to designate the operation of the printer, and is expressed in, for example, XML (eXtensible Markup Language):

```
01:    <?xml version="1.0" encoding="utf-8" ?>
02:    <cmd xmlns:trans="http://www.xxxx/yyyyy/">
03:        <contents>
04:            <operation>GetPrinterInfo</operation>
05:        </contents>
06:    </cmd>
```

A numerical value such as "01:" written on the left side of each line is a line number added for the descriptive purpose, and is not described in an original text in the XML format.

The first line indicates a header representing that the command is described in the XML format.

On the second line, cmd indicates the start of the command. A name space is designated by xmlns to designate the definition of interpretation of the command. Note that </cmd> on the sixth line indicates the end of the command.

The third line indicates a declaration of describing contents thereafter, and the fifth line indicates the end of the contents.

On the fourth line, an instruction to be requested is described. An actual instruction word exists between <operation> and </operation>. An instruction word "GetPrinterInfo" is an instruction to obtain information of the printer 115 serving as an external device. This instruction word describes, for example, a content of requesting to provide printer information such as a paper type, a size, the presence/absence of a borderless print function, and the print quality supported by the printer 115.

Note that the command may be generated by loading a permanent text stored in advance in the ROM 102 or the like. Also, the command is not limited to the text format such as XML, and may be described in the binary format and communicated by a protocol complying with the format. The generated command is transmitted to the printer 115 via the communication control unit 217 of the OS layer 203 in a format complying with a protocol supported by a transmission destination printer. The method of communication with the printer 115 is not limited to the above one. Connection using Wi-Fi Direct, Bluetooth, infrared communication, a telephone line, a wired LAN, or a USB is also usable.

Although a command is generated in the native layer 202 in the above description, it may be generated in the script layer 201. In this case, an instruction sentence in the XML format is created in the script layer 201 and transferred to the native layer 202. After that, the instruction sentence is transmitted to the IP address of the printer 115 in a format complying with a communication protocol in the above-described manner.

In step S906, upon receiving the command, the printer 115 transmits the printer information in the XML format complying with the communication protocol to the portable information terminal 100. The printer information is sent to the native layer 202. An example of the printer information is given by:

```
01:    <?xml version="1.0" encoding="utf-8" ?>
02:    <cmd xmlns:trans="http://www.xxxx/yyyyy/">
03:        <contents>
04:            <device id="Printer001" />
05:            <mode = 1>
06:                <media>GlossyPaper</media>
07:                <size>A4</size>
08:                <quality>1</quality>
09:                <border>no</border>
10:            </mode>
11:            <mode = 2>
                   ...
               </mode>
               <mode = 3>
                   ...
               </mode>
               ...
           </contents>
       </cmd>
```

The first line indicates a header representing that the information is described in the XML format.

On the second line, cmd indicates the start of the command. A name space is designated by xmlns to designate the definition of interpretation of the command. Note that </cmd> on the last line indicates the end of the command.

The third line indicates a declaration of describing contents thereafter, and the contents continue up to </contents>.

The fourth line indicates a device ID representing that the model name of the printer is "Printer001".

The fifth line and subsequent lines describe respective modes. Information of a corresponding mode is described between <mode> and </mode>. On the fifth line, the number of a mode is 1. After that, <media> describes the type of printing paper, <size> describes a paper size, <quality> describes the print quality, and <border> describes bordered/borderless information.

The 11th and subsequent lines describe information about mode 2 serving as another mode. In this way, the model name of a printer and all print modes supported by the printer are described in the XML format. Note that the method of describing printer information is not limited to this. The printer information may be described by a text, which is not a tag format, a binary format, or the like. Although information of the print function of the printer is transferred in the above example, the present invention is not limited to this. For example, image processing and analysis processing processable by the printer, the presence/absence of a silent print mode, the presence/absence of the use of a memory card, and status information such as the remaining ink amount may be transferred. Examples of image processing are color conversion (for example, monochrome conversion, sepia conversion, and chroma enhancement), multiple image layout, white balance correction, noise reduction, and processing of automatically correcting a photo to a preferable color and luminance.

In step S907, the printer data generation unit 215 of the native layer 202 receives the printer information from the printer 115 via the communication control unit 217 of the OS layer 203. The printer data generation unit 215 obtains, from the received printer information, the items of the type and size of printing paper, print quality, and bordered/borderless in all the modes, and the number of items.

In step S908, the printer data generation unit 215 of the native layer 202 sends the printer information to the script layer 201 in a format interpretable by the script layer 201. For example, the printer data generation unit 215 of the native layer 202 sends the printer information in the XML format just as it has been received, or sends it after converting it into a tag-less text format. Every time a specific native function is invoked from the script layer 201, information may be transmitted as a return value. Alternatively, the argument of a mode to be obtained or the like may be given to the native function, and information may be transmitted as a return value. In addition, the information may be transferred using a JSON character string, or transferred by the data conversion units 207 and 208 using a character string such as base64.

In step S909, the script layer 201 forms a display screen based on the received printer information, and displays it on the display 106. If there are a plurality of connectable printers, the script layer 201 performs processing of displaying a plurality of printer names so that the user can select a printer. Note that selection of a printer is not limited to this. For example, the printer may be selected based on a printer which responds earliest, a printer having more functions, a printer with not so many print jobs, or the like.

In step S909, the script layer 201 performs processing of displaying, on the display 106, the print setting screen for prompting the user to select the type and size of printing paper, the print quality, bordered/borderless, and the like. An example of the method of forming a print setting screen is an HTML/JavaScript description:

```
<!DOCTYPE html>
<head>
<title>print setting </title>
<script>
   <!-- paper size -->
      var PaperSizeNum = GetPaperSizeNum( );
   var p = document.getElementById("PaperList");
   var i;
      for(i=0; i<PaperSizeNum; i++){
         p.options[i] = new Option(GetPaperSize(i),
   GetPaperSize(i));
   }
      <!-- paper type -->
   var MediaTypeNum = GetMediaTypeNum( );
      var m = document.getElementById("MediaList");
      var j;
      for(j=0; j<MediaTypeNum; j++){
   m.options[i] = new
   Option(GetMediaType(j),GetMediaType(j));
   }
      <!-- print quality -->
      var QualityNum = GetQualityNum( );
   var q = document.getElementById("QualityList");
   var k
      for(k=0; k< QualityNum; k++){
         q.options[i] = new Option(GetQuality(k),
   GetQuality(k));
   }
      <!-- bordered/borderless -->
      var BorderNum = GetBorderNum( );
   var b = document.getElementById("BorderList");
   var l;
      for(l=0; l<BorderNum; l++){
   b.options[i] = new Option(GetBorder(l),GetBorder(l));
   }
      <!-- print function -->
      function printer( ) {
      SetPrint(document.getElementById("PaperList").value,
   document.getElementById("MediaList").value,
   document.getElementById("QualityList").value,
   document.getElementById("BorderList").value);
      }
</script>
</head>
<!-- display unit -->
<body>
paper size: <select id="PaperList"></select><br />
paper type: <select id="MediaList"></select><br />
print quality: <select id="QualityList"></select><br />
borderless: <select id="BorderList"></select><br />
<br />
<button id="btn1" onclick="printer( )">print setting completion</button>
</body>
</html>
```

In the above description, GetPaperSizeNum( ) GetMediaTypeNum( ) GetQualityNum( ) and GetBorderNum( ) are native functions, and each native function has a function of obtaining an item count. For example, when paper sizes supported by the printer are four types of A4, A5, B5, and L size, GetPaperSizeNum( ) returns 4.

Also, GetPaperSize(n), GetMediaType(n), GetQuality(n), and GetBorder(n) are native functions, and each function returns the nth character string corresponding to the argument n. For example, the return value of GetPaperSize(0) as a function of returning the paper size is "A4", and the return value of GetPaperSize(1) is "A5". These values are obtained by the native layer 202 from information sent from the printer 115 via the OS layer 203.

Also, GetPaperSizeV(n), GetMediaTypeV(n), GetQualityV(n), and GetBorderV(n) are native functions, and each function returns the nth value corresponding to the argument n. For example, the return value of GetMediaTypeV(0) as a function of returning the text of a paper type is a word such as "glossy paper" which is displayed and presented to the user. To the contrary, the return value of GetMediaTypeV(0) is a word such as "GlossyPaper" which can be interpreted by the printer 115. The native layer 202 decides these words in association with the information sent from the printer 115. For example, if a value extracted from information sent from the printer 115 is "GlossyPaper", "glossy paper" is decided as a text to be displayed. As the decision method, the native layer 202 holds a correspondence table in advance and decides a text in accordance with the correspondence table.

In the above example, the paper size, paper type, print quality, and bordered/borderless settings are made. However, the present invention is not limited to this, and other settings such as double-sided/single-sided, color/monochrome, and ON/OFF of image correction may be made. Furthermore, not only the above-mentioned print function, but also information about image processing and analysis processing processable by the printer 115, the presence/absence of a silent print mode, the presence/absence of the use of a memory card, and a status such as the remaining ink amount may be displayed.

For example, a user interface such as a print setting screen 1301 shown in FIG. 13 is implemented using a Web rendering engine based on the obtained information as in the above example. That is, in this embodiment, the script layer 201 requests printer information of the external printer 115 via the native layer 202, and displays the print setting screen on the display 106 based on information obtained using the native function. Note that the HTML can be formed either in the script layer 201 or in the native layer 202. As shown in FIG. 13, the paper size and the like are provided by a pull-down menu, and a touch operation of selecting an item by the user can be accepted (step S910).

If the user performs a setting operation on the print setting screen 1301 and pressing of the setting completion button 1102 is detected, the printer control unit 214 of the script layer 201 transmits each print information selected by the user in step S910 to the native layer 202 in step S911. In the above HTML example, SetPrint( ) invokes a native function by using the obtained printer setting information as an argument. In the above example, the paper size, paper type, print quality, and bordered/borderless settings are transferred as character strings to the native layer 202.

In step S912, the printer data generation unit 215 of the native layer 202 obtains the print information transmitted from the script layer 201. The printer data generation unit 215 generates a print command in accordance with the communication protocol of the printer based on the obtained print information, and transmits the print command to the printer 115 via the communication control unit 217 of the OS layer 203.

[Rendering]

Figure 10:
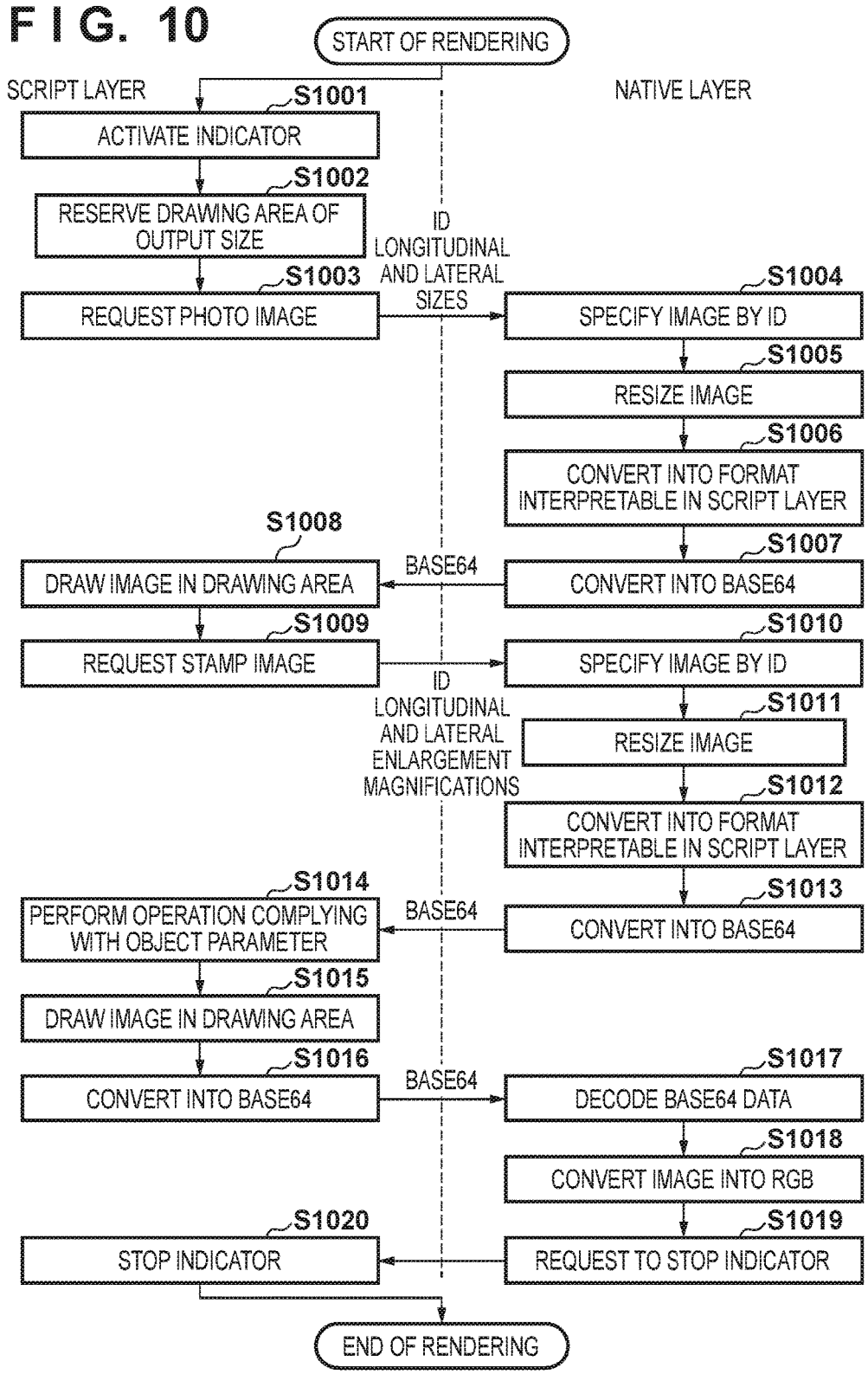
FIG. 10 is a flowchart showing rendering processing in step S307.

When pressing of the setting completion button 1302 of the print setting screen 1301 by the user is detected, the processing in step S307 starts. FIG. 10 is a flowchart showing the rendering processing in step S307.

In step S1001, the script layer 201 activates an indicator and displays it on the display 106.

In step S1002, the image processing control unit 213 of the script layer 201 decides an output size corresponding to a printing paper size based on print information set in step S911, and reserves an output image area corresponding to the output size in the RAM 103.

In step S1003, the image processing control unit 213 of the script layer 201 requests the native layer 202 to resize photo image data. At this time, the image processing control unit 213 transfers the ID of the photo image data and the output size (lateral and longitudinal sizes) decided in step S1002 to the native layer 202.

In step S1004, the image processing unit 210 of the native layer 202 specifies image data (RGB data) corresponding to the ID transferred in step S1003.

In step S1005, the image processing unit 210 of the native layer 202 resizes the image data specified in step S1004 into the output size decided in step S1002.

In step S1006, the image processing unit 210 of the native layer 202 generates image data capable of converting the image data resized in step S1005 into a format supported by the script layer 201. In this embodiment, for example, image data in the JPEG format is generated. The conversion from RGB data into JPEG data uses an encoder included in the OS.

In step S1007, the data conversion unit 207 of the native layer 202 converts the JPEG data into base64 data, and transmits the base64 data to the script layer 201.

In step S1008, the data conversion unit 208 of the script layer 201 receives the base64 data transmitted from the native layer 202. The image processing control unit 213 of the script layer 201 draws the base64 data in the output image area reserved in step S1002.

In step S1009, the image processing control unit 213 of the script layer 201 calculates longitudinal and lateral enlargement magnifications based on the drawing area 1206 and the output size decided in step S1002. The image processing control unit 213 sends the ID of stamp image data, and the calculated longitudinal and lateral enlargement magnifications to the native layer 202. In addition, the image processing control unit 213 requests the native layer 202 to resize the stamp image data.

In step S1010, the image processing unit 210 of the native layer 202 specifies stamp image data (RGB data) corresponding to the ID transferred in step S1009.

In step S1011, the image processing unit 210 of the native layer 202 resizes the stamp image data specified in step S1010 into the output size decided in step S1002.

In step S1012, the image processing unit 210 of the native layer 202 generates image data capable of converting the image data resized in step S1011 into a format supported by the script layer 201.

In step S1013, the data conversion unit 207 of the native layer 202 converts the JPEG data into base64 data, and transmits the base64 data to the script layer 201.

In step S1014, the data conversion unit 208 of the script layer 201 receives the base64 data transmitted from the native layer 202. The content drawing unit 211 reflects the operation content (for example, rotation) in the content operating unit 212 on the received base64 data.

In step S1015, the image processing control unit 213 of the script layer 201 draws the base64 data in the output image area reserved in step S1002. By this processing, the photo image and the stamp image reflecting the operation content such as rotation are combined in the output image area.

In step S1016, the data conversion unit 208 of the script layer 201 converts the data in the output image area into base64 data, and transmits the base64 data to the native layer 202. As a method of converting data into base64 data and obtaining it, the ToDataURL method of the HTML canvas may be used.

In step S1017, the printer data generation unit 215 of the native layer 202 decodes the base64 data transmitted from the script layer 201.

The printer data generation unit 215 of the native layer 202 converts the decoded data into RGB data in step S1018, and requests the script layer 201 to stop the indicator in step S1019. In step S1020, the script layer 201 stops the indicator and stops the display on the display.

[Printing]

Figure 11:
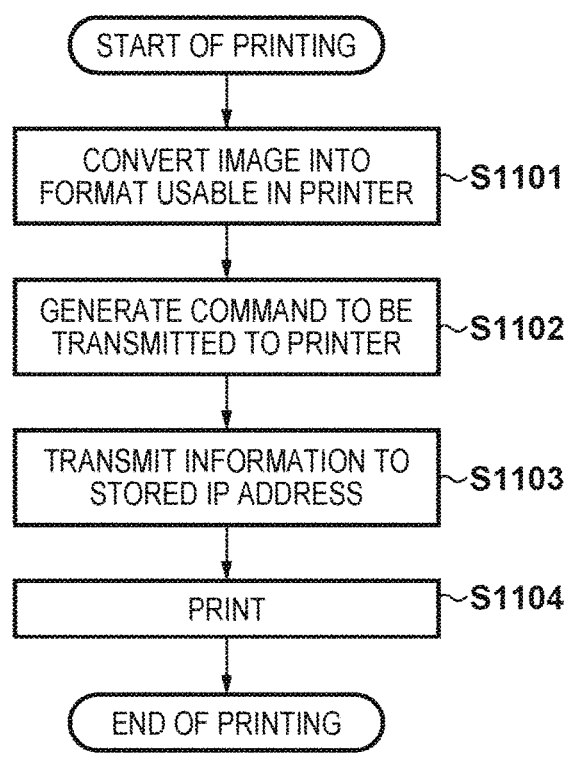
FIG. 11 is a flowchart showing print processing in step S308.

After the processing in step S1020 ends, the processing in step S308 starts. FIG. 11 is a flowchart showing the print processing in step S308.

In step S1101, the printer data generation unit 215 of the native layer 202 converts the RGB data converted in step S1018 into a data format processable by the printer 115 based on the print information obtained in step S912. Data formats processable by the printer 115 vary from a standard format (for example, JPEG) to a vendor-specific format. Any of these data formats is available here.

In step S1102, the printer data generation unit 215 of the native layer 202 generates a command to be transmitted to the printer 115 based on the print information and the data generated in step S1101.

In step S1103, the printer data generation unit 215 of the native layer 202 transmits the command generated in step S1102 via the communication control unit 217 of the OS layer 203 in accordance with a communication protocol supportable by the printer 115. At this time, the transmission destination is the IP address stored in step S904.

In step S1104, the printer 115 starts printing and outputs a printed product.

[Communication Protocol]

In this embodiment, as in the above-described example, the native layer 202 implements communication with an external device (for example, a printer) using a communication protocol such as Bonjour or HTTP. Information at the time of communication is represented by a combination (format) of an array of "0"s or "1" s. For the purpose of communication, the format of information to be communicated needs to be defined. The definition of the format is a communication protocol. An example in which various different kinds of information are communicated between the application and the external device has been explained. However, formats each representing information are different, so the application needs to handle a plurality of different communication protocols at the time of communication. By handling the plurality of communication protocols by the application, a plurality of functions of the external device can be used.

Figure 14:
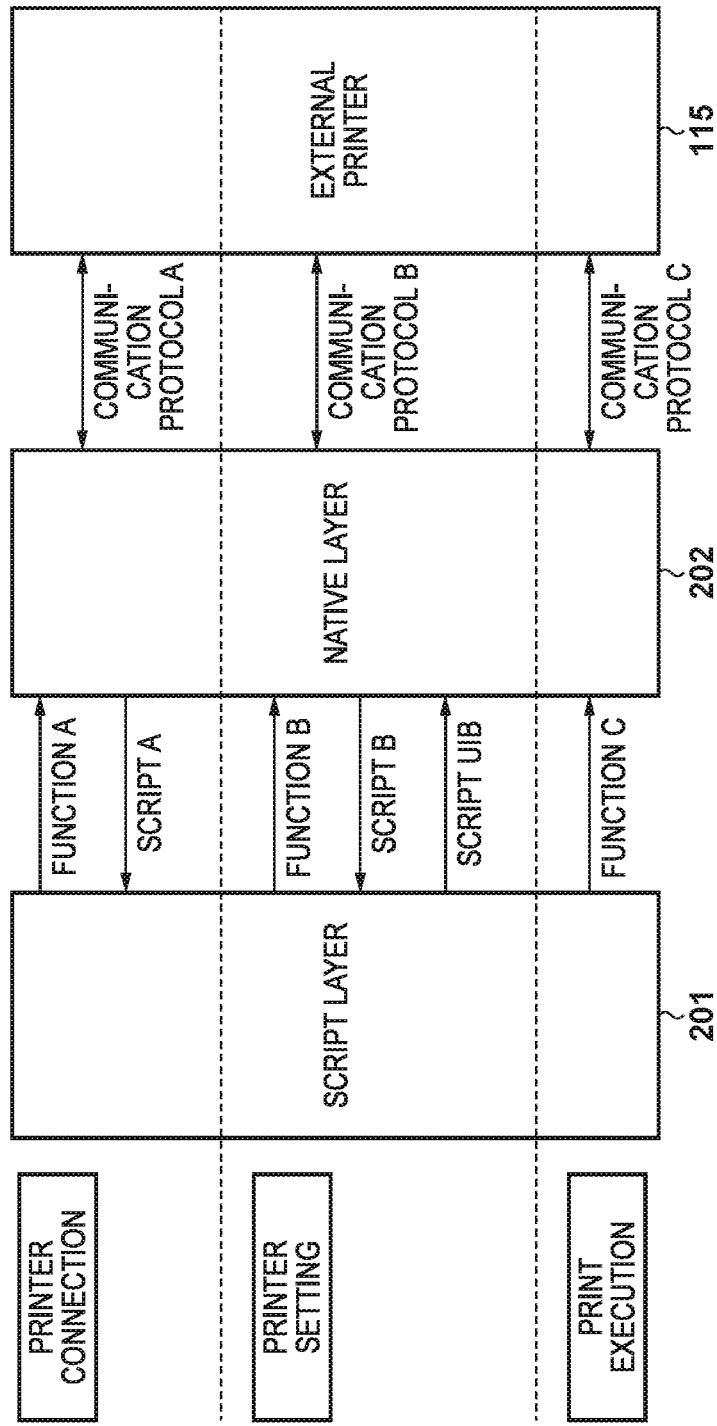
FIG. 14 is a view for explaining communication with an external device using a plurality of communication protocols.

An example in which printer connection, printer setting, and print execution are implemented using a plurality of communication protocols will be described with reference to FIG. 14.

In printer connection, the script layer 201 invokes a function A from the native layer 202. The function A is a function of connecting a printer as an external device. When the function A is invoked, the native layer 202 discovers and connects a printer on the network by using a communication protocol A. The communication protocol A is, for example, Bonjour mentioned above or SSDP (Simple Service Discovery Protocol). These communication protocols are defined to discover an external device on the network. Upon connection to the printer, the native layer 202 generates a script A notifying the script layer 201 of the connected printer, and sends it to the script layer 201. The script layer 201 translates the script A and can know the connected printer.

In printer setting, the script layer 201 invokes a function B from the native layer 202. The function B is a function of obtaining function information of the connected printer. The function information is printer information described in step S906 of FIG. 9. When the function B is invoked, the native layer 202 obtains the function information by using the connected printer and a communication protocol B. The communication protocol B is, for example, HTTP mentioned above. Upon obtaining the function information of the printer, the native layer 202 generates a script B notifying the script layer 201 of the obtained function information, and sends it to the script layer 201. The script layer 201 translates the script B and can know the function information.

Then, the script layer 201 generates a script UIB based on the obtained function information, and sends it to the native layer 202. The script UIB is, for example, HTML described in step S909 of FIG. 9. By using a Web rendering engine, the script UIB can be displayed as, for example, the print setting screen shown in FIG. 13 on the display 106.

In print execution, the script layer 201 invokes a function C from the native layer 202. The function C is a function for printing by the connected printer. When the function C is invoked, the native layer 202 generates print data for printing by the printer. The print data is a command generated in step S1002 based on the data generated in step S1101 of FIG. 11. The generated print data is sent to the printer by using a communication protocol C, and printing is executed. The communication protocol C is, for example, MTOM (Message Transmission Optimization Mechanism). MTOM is a communication protocol defined to efficiently transmit/receive binary data. MTOM is therefore a communication protocol suited to print data having a relatively large data size, such as an image. There is also a method using a unique communication protocol complying with a printer-specific data format. In this case, the native layer 202 supports a printer-specific communication protocol, enabling printing.

As described above, the script layer 201 in which communication with an external device is restricted can communicate with the external device via the native layer 202. By using a plurality of different communication protocols, it becomes possible to issue an information providing request from the script layer 201 and obtain printer information, and to perform a print instruction from the script layer 201 and print by the printer.

[Second Embodiment]

The first embodiment has described a form in which print execution is performed using one communication protocol. The second embodiment will describe a form in which print execution is performed using a plurality of different communication protocols. A difference from the first embodiment will be explained below. More specifically, the second embodiment adopts the same hardware arrangement and software arrangement as those in the first embodiment. Communication protocols in printer connection and printer setting are the same as those described with reference to FIG. 14, and a communication protocol in print execution will be explained below.

A print job is defined here. The print job is constituted by a detailed setting data part and a print data part for printing.

The detailed setting data part will be explained. A printer can perform various operations in accordance with detailed settings. Like print information exemplified in step S1102 of FIG. 11, the detailed setting data part is an XML data set indicating the following pieces of setting information:
  print speed setting
  print quality setting
  color/monochrome setting
  image correction setting
  paper setting
  paper feed tray setting
  discharge tray setting
  setting of the distance between paper and, for example, the printhead of an inkjet printer
  setting of an extra-printing amount from paper at the time of borderless printing The print data part will be explained. The print data part is, for example, a binary data set indicating image data exemplified in step S1101 of FIG. 11. When all image processes are executed on image data on the printer side, the print data part is a binary data set indicating RGB multi-valued data. When only image correction is executed on the application side, the print data part is a binary data set indicating RGB multi-valued data having undergone the image correction. When data is separated into colors corresponding to the color materials of a printer and processes up to quantization are executed on the application side, the print data part is, for example, a binary data set indicating CMYK quantized data.

Figure 15:
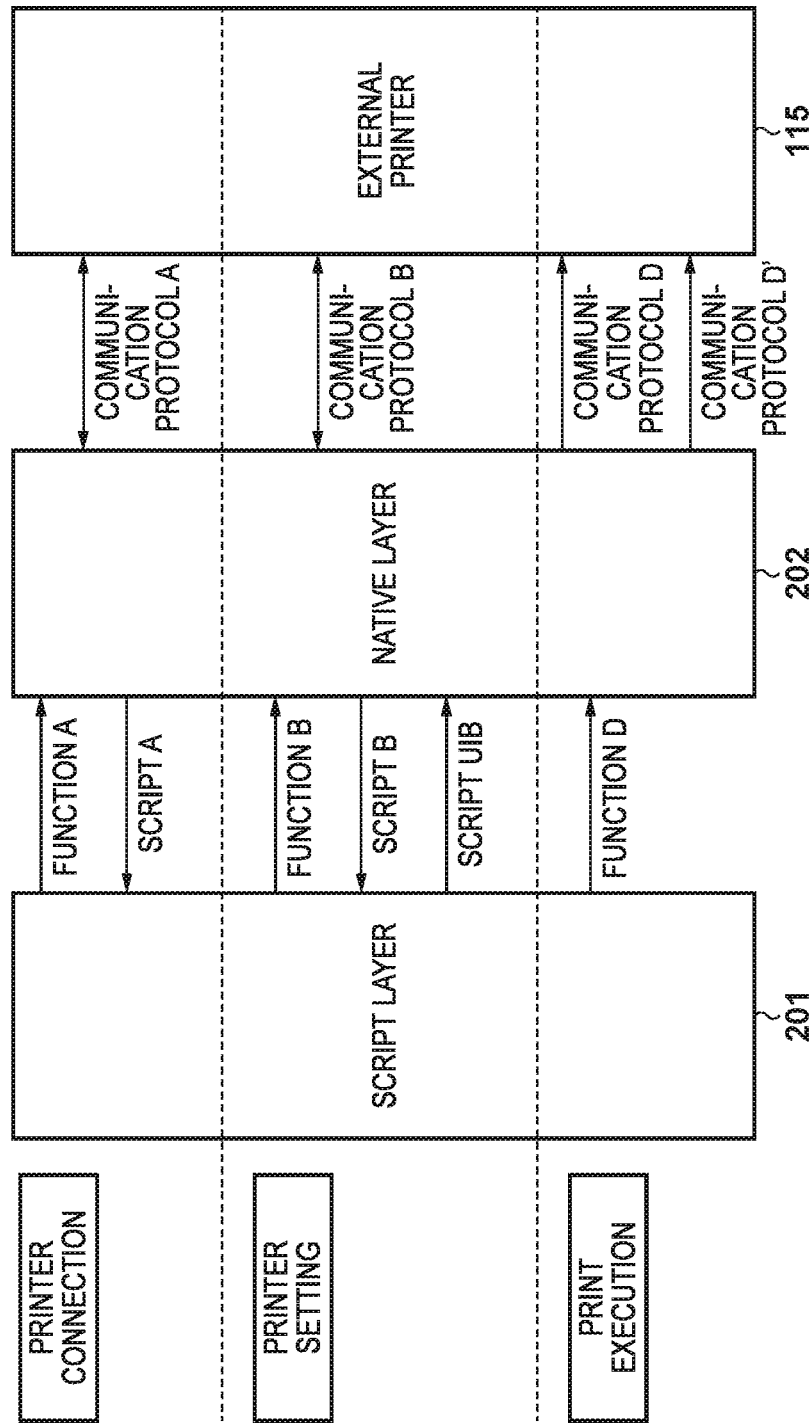
FIG. 15 is a view for explaining communication using a communication protocol in print execution.

The communication protocol in print execution will be explained with reference to FIG. 15. When the user presses a print button 1205 in FIG. 12, printing is executed. In print execution, a script layer 201 invokes a function D from a native layer 202. The function D is a function for sending a print job to the printer. The native layer 202 generates a print job in accordance with an argument transferred from the script layer 201 to the function D. The argument reflects a user instruction on a UI provided by the application. When a setting completion button 1302 in FIG. 13 is pressed, information about detailed settings of the printer operation designated by the user is transferred to the argument. By referring to this argument, the native layer 202 generates a detailed setting data part. Also, when a photo image selection button 1201 in FIG. 12 is pressed, information about image data designated by the user is transferred to the argument. By referring to this argument, the native layer 202 generates a print data part.

Of the generated print job, the detailed setting data part is sent to the printer by using a communication protocol D. The print data part is sent to the printer by using a communication protocol D'. The communication protocol D is, for example, SOAP (Simple Object Access Protocol) suited to communication of XML data. The communication protocol D' is, for example, MTOM suited to communication of a large amount of binary data. A method using a unique communication protocol complying with a printer-specific data format is also usable. In this case, the native layer 202 supports a printer-specific communication protocol, enabling printing.

The print job is constituted by including the detailed setting data part and the print data part. It is effective to send the detailed setting data part prior to the print data part. This is because the detailed setting part includes settings which designate the operations of physical mechanisms such as the setting of the tray and the distance setting between paper and the printhead. These mechanism operations need to be performed before printing using print data. Depending on the printer model, printing starts at default settings based on only the print data part. In this case, printing at detailed settings designated by the user cannot be executed unless the detailed setting data part is sent previously.

As described above, the script layer 201 in which communication with an external device is restricted can communicate with the external device via the native layer 202. By using a plurality of different communication protocols for a print job, printing complying with detailed settings designated by the user can be performed.

[Third Embodiment]

The third embodiment will describe a form in which the status of a printer is confirmed during print execution by using a communication protocol different from those described in the first and second embodiments. A difference from the first and second embodiments will be explained below. More specifically, the third embodiment adopts the same hardware arrangement and software arrangement as those in the first embodiment. Communication protocols in printer connection, printer setting, and print execution are the same as those described with reference to FIG. 15.

Figure 16:
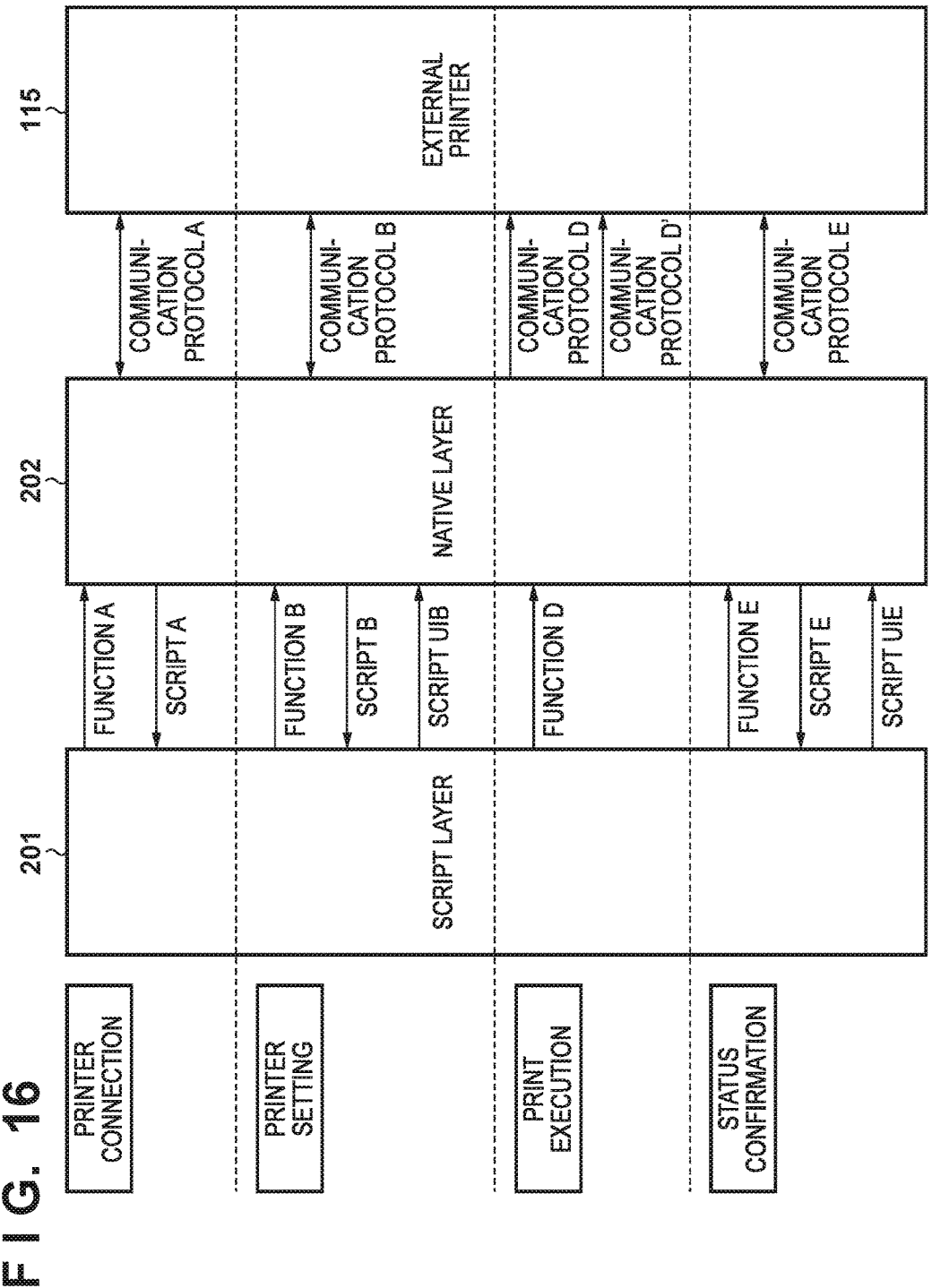
FIG. 16 is a view for explaining communication using a communication protocol in status confirmation.

A status is defined here. The status is the current state of a printer and includes, for example, the following pieces of information:
  the remaining amount of a color material
  the remaining amount of paper
  print progress The communication protocol in status confirmation will be explained with reference to FIG. 16. In status confirmation, a script layer 201 invokes a function E from a native layer 202. The function E is a function of obtaining the status of a connected printer. When the function E is invoked, the native layer 202 obtains the status by using the connected printer and the communication protocol E. The communication protocol E is, for example, HTTP described above or GENA (General Event Notification Architecture) which is an extension of HTTP. When the status of the printer is obtained, the native layer 202 generates a script E notifying the script layer 201 of the obtained status, and sends it to the script layer 201. The script layer 201 translates the script E and can know the status.

Figure 17:
FIG. 17 is a view showing a progress bar.

Then, the script layer 201 generates a script UIE based on the obtained status, and sends it to the native layer 202. The script UIE is described as follows by HTML. In the following example, the current progress of printing is indicated by a progress bar, as shown in FIG. 17:

---
```
<section>
<h2>image processing</h2>
<p><progress value="70" max="100"></progress></p>
</section>
```
---

As another example, when the following HTML is described in the script UIE, an error message representing that the color material or paper runs out can be displayed:

---
```
<html>
<head>
<script type="text/javascript" language="javascript">
  function error( ) {
    window.alert(ERROR_MESSAGE \n);
  }
</script>
</head>
</html>
```
---

As described above, the script layer 201 in which communication with an external device is restricted can communicate with the external device via the native layer 202. In addition, the user can be notified of the current state of a printer by using a communication protocol different from a protocol used to communicate print data.

[Other Embodiments]

Each of the aforementioned embodiments has explained an arrangement in which a hybrid application is operated on the portable information terminal 100. However, the present invention is not limited to this arrangement. For example, the environment where the application operates may be a PC, server, game machine, or digital camera, in addition to the portable information terminal typified by a smartphone or tablet PC.

In addition, each embodiment has explained the printer as an external device, but the present invention is not limited to this. For example, another smartphone, tablet PC, PC, server, game machine, or scanner may be a target as an external device. For example, it becomes possible to obtain, from the script layer 201, information about the function of the terminal such as the battery level, communication state, wireless LAN connection presence/absence, GPS, temperature, humidity, and acceleration of another portable information terminal.

Examples of an external device include even an electric appliance and car. For example, according to each embodiment, it becomes possible to obtain information of an external refrigerator, washing machine, air conditioner, lighting, vacuum cleaner, or thermo pot from the script layer 201 on the portable information terminal, and adjust ON/OFF and output of the function of each device.

The purpose of the present invention can also be achieved as follows. First, a storage medium on which the program code of software for implementing the functions of the above-described embodiments is recorded is supplied to a system or apparatus. The program code is in the script form, native form, or both of them. Then, the computer (or the CPU or MPU) of the system or apparatus reads out and executes the program code stored in the storage medium. In this case, the program code read out from the storage medium implements the functions of the above-described embodiments, and the storage medium storing the program code constitutes the present invention. The functions of the above-described embodiments are implemented by executing the readout program code by the computer. In addition, the present invention includes even a case in which, for example, an operating system (OS) running on the computer performs some or all of actual processes based on the instruction of the program code, and the functions of the above-described embodiments are implemented by this processing.

Further, the present invention includes even the following case. The program code read out from the storage medium is written in the memory of a function expansion card inserted into the computer or a function expansion unit connected to the computer. After that, the CPU of the function expansion card or function expansion unit or the like performs some or all of actual processes based on the instruction of the program code. By this processing, the functions of the above-described embodiments are implemented.

In addition, each of the above-described embodiments has explained the canvas function of JavaScript for drawing of a content, but drawing of a content is not limited to this. For example, a content can also be drawn using SVG (Scalable Vector Graphics).

Although one image is selected from an image folder in a device in each of the above-described embodiments, the present invention is not limited to this. An image may be obtained by, for example, designating the absolute path of data, designating a folder which stores the image, or capturing an image on site using the camera function of a device. As for the image data obtaining destination, it is also possible to, for example, select an image on the Internet, select an image in a removable storage medium, or obtain an image by communication with an external device.

The printer in each of the above-described embodiments is, for example, an inkjet printer, a laser printer, a sublimation printer, or a dot impact printer. The printer may be a so-called multi-function peripheral (MFP) having not a single function but the scanner function and the like.

<Other Embodiments>

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-135174, filed Jun. 30, 2014, which is hereby incorporated by reference herein in its entirety.

What is claimed is:

1. An information processing apparatus comprising:
   a processor;
   a storage unit configured to store a hybrid application program having a layered structure including (i) a first layer which is described in a first language and is constituted by a script instruction which is translated to be able to execute the script instruction by the processor when executing an application, and (ii) a second layer which is described in a second language and performs invocation of a function of an OS (Operating System) on which the processor executes the hybrid application program, the hybrid application program executing the application by cooperation between the first layer and the second layer; and a communication unit,
wherein the processor, by executing the second layer in the hybrid application program, causes the communication unit to communicate with a printing apparatus in accordance with a first communication protocol in a case where first processing is executed in communication with the printing apparatus, and to communicate with the printing apparatus in accordance with a second communication protocol in a case where second processing is executed in communication with the printing apparatus, and
wherein the processor transmits, by executing the second layer in the hybrid application program, data to the printing apparatus by the communication unit, so that an image corresponding to the data is printed by the printing apparatus.

2. The information processing apparatus according to claim 1, wherein the processor causes the communication unit to connect to the printing apparatus in accordance with the first communication protocol, and to transmit the data to the printing apparatus in accordance with the second communication protocol.

3. The information processing apparatus according to claim 2, wherein the first communication protocol is Bonjour or SSDP.

4. The information processing apparatus according to claim 2, wherein the second communication protocol is MTOM.

5. The information processing apparatus according to claim 2, wherein the communication unit obtains status information of the printing apparatus in accordance with a third communication protocol.

6. The information processing apparatus according to claim 5, wherein the third communication protocol is HTTP or GENA.

7. The information processing apparatus according to claim 2, wherein the communication unit obtains function information of the printing apparatus in accordance with a third communication protocol.

8. The information processing apparatus according to claim 7, wherein the third communication protocol is HTTP.

9. The information processing apparatus according to claim 1, wherein the processor causes a display unit to display a print setting screen based on information of the printing apparatus that has been obtained by the communication unit.

10. The information processing apparatus according to claim 1, wherein the processor converts, in the second layer, information obtained by the communication unit from the printing apparatus, into a format interpretable in the first layer, and transmits the converted information to the first layer.

11. The information processing apparatus according to claim 10, wherein the processor, in the first layer, causes a display unit to display a display item based on the converted information.

12. The information processing apparatus according to claim 1, wherein the first language includes HTML, CSS, or Javascript.

13. The information processing apparatus according to claim 1, wherein the second language is a language corresponding to the OS.

14. An information processing method to be executed in an information processing apparatus including (a) a processor, and (b) a storage unit configured to store a hybrid application program having a layered structure including (i) a first layer which is described in a first language and is constituted by a script instruction which is translated to be able to execute the script instruction by the processor when executing an application, and (ii) a second layer which is described in a second language and performs invocation of a function of an OS (Operating System) on which the processor executes the hybrid application program, the application program executing the application by cooperation between the first layer and the second layer, the information processing method comprising:
obtaining data to be printed, by executing the hybrid application program by the processor; and
transmitting, by executing the second layer in the application program by the processor, the data to the printing apparatus by a communication unit, so that an image corresponding to the data is printed by the printing apparatus,
wherein the processor, by executing the second layer in the hybrid application program, causes the communication unit to communicate with the printing apparatus in accordance with a first communication protocol in a case where first processing is executed in communication with the printing apparatus, and to communicate with the printing apparatus in accordance with a second communication protocol in a case where second processing is executed in communication with the printing apparatus.

15. A non-transitory computer-readable storage medium storing a hybrid application program having a layered structure including (i) a first layer which is described in a first language and is constituted by a script instruction which is translated to be able to execute the script instruction by a processor when executing an application, and (ii) a second layer which is described in a second language and performs invocation of a function of an OS (Operating System) on which the processor executes the hybrid application program, wherein the hybrid application program is configured to perform, by cooperation between the first layer and the second layer:
obtaining data to be printed, by executing the hybrid application program by the processor; and
transmitting, by executing the second layer in the application program by the processor, the data to the printing apparatus by a communication unit, so that an image corresponding to the data is printed by the printing apparatus,
wherein the processor, by executing the second layer in the hybrid application program, causes the communication unit to communicate with the printing apparatus in accordance with a first communication protocol in a case where first processing is executed in communication with the printing apparatus, and to communicate with the printing apparatus in accordance with a second communication protocol in a case where second processing is executed in communication with the printing apparatus.

16. The information processing apparatus according to claim 1, wherein the second layer is constituted by an instruction which is translated in advance to be able to execute the instruction by the processor.

17. The information processing method according to claim 14, wherein the processor causes the communication unit to connect to the printing apparatus in accordance with the first communication protocol, and to transmit the data to the printing apparatus in accordance with the second communication protocol.

18. The information processing method according to claim 17, wherein the communication unit obtains status information of the printing apparatus in accordance with a third communication protocol.

19. The information processing method according to claim 17, wherein the communication unit obtains function information of the printing apparatus in accordance with a third communication protocol.

20. The information processing method according to claim 14, wherein in a case where a print job includes a print setting and the data, the print setting and the data are transmitted to the printing apparatus in accordance with a plurality of different communication protocols.

21. The information processing method according to claim 14, wherein the processor causes a display unit to display a print setting screen based on information of the printing apparatus that has been obtained by the communication unit.

22. The information processing method according to claim 14, wherein the processor converts, in the second layer, information obtained by the communication unit from the printing apparatus, into a format interpretable in the first layer, and transmits the converted information to the first layer.

23. The information processing method according to claim 22, wherein the processor, in the first layer, causes a display unit to display a display item based on the converted information.

24. The information processing method according to claim 14, wherein the second language is a language corresponding to the OS.

25. The information processing apparatus according to claim 1, wherein in a case where a print job includes a print setting and the data, the processor transmits the print setting and the data to the printing apparatus in accordance with a plurality of different communication protocols.

* * * * *